__US011507708B2__

(12) United States Patent
Cheong et al.

(10) Patent No.: US 11,507,708 B2
(45) Date of Patent: Nov. 22, 2022

(54) SYSTEM-LEVEL APPROACH TO GOAL-DRIVEN DESIGN

(71) Applicant: Autodesk, Inc., San Francisco, CA (US)

(72) Inventors: Hyunmin Cheong, Toronto (CA); Wei Li, Toronto (CA); Francesco Iorio, Ontario (CA)

(73) Assignee: AUTODESK, INC., San Francisco, CA (US)

( * ) Notice: Subject to any disclaimer, the term of this patent is extended or adjusted under 35 U.S.C. 154(b) by 681 days.

(21) Appl. No.: 15/215,525

(22) Filed: Jul. 20, 2016

(65) Prior Publication Data

US 2017/0024647 A1 Jan. 26, 2017

Related U.S. Application Data

(60) Provisional application No. 62/196,264, filed on Jul. 23, 2015.

(51) Int. Cl.
*G06F 30/00* (2020.01)
*G06F 16/2458* (2019.01)
(Continued)

(52) U.S. Cl.
CPC .......... *G06F 30/00* (2020.01); *G06F 16/2477* (2019.01); *G06F 30/15* (2020.01);
(Continued)

(58) Field of Classification Search
CPC .. G06F 17/50; G06F 16/2477; G06F 17/2785; G06F 16/285; G06F 17/20; G06N 5/022
See application file for complete search history.

(56) References Cited

U.S. PATENT DOCUMENTS 5,552,995 A 9/1996 Sebastian
6,910,004 B2 * 6/2005 Tarbouriech .......... G06F 17/271
704/4
(Continued)

FOREIGN PATENT DOCUMENTS

WO 02/21345 A1 3/2002

OTHER PUBLICATIONS

Construct—Dictionary Definition. Vocabulary.com, https://www.vocabulary.com/dictionary/construct. Accessed Jan. 31, 2019 (Year: 2019).*

(Continued)

*Primary Examiner* — Vincent Gonzales
(74) *Attorney, Agent, or Firm* — Artegis Law Group, LLP

(57) ABSTRACT

A design application is configured to perform a system-level optimization of a collection of system components. The design application iteratively executes a multi-objective solver to optimize structural and functional relationships between the system components in order to meet global design criteria and generate a system design. The design application initializes the design process by extracting from a knowledge base system templates having taxonomic, structural, or functional attributes relevant to the system design. The design application generates the knowledge base by mining taxonomic, structural, and functional relationships from a corpus of engineering texts.

21 Claims, 18 Drawing Sheets

(51) Int. Cl.
   *G06F 30/15* (2020.01)
   *G06F 30/17* (2020.01)
   *G06N 5/02* (2006.01)
   *G06F 111/02* (2020.01)

(52) U.S. Cl.
   CPC .............. *G06F 30/17* (2020.01); *G06N 5/022* (2013.01); *G06F 2111/02* (2020.01)

(56) References Cited

U.S. PATENT DOCUMENTS

| | | |
|---|---|---|
| 7,295,958 B1 | 11/2007 | Suh et al. |
| 7,730,072 B2 | 6/2010 | Richter et al. |
| 10,013,510 B1 | 7/2018 | Kanthasamy et al. |
| 2008/0172208 A1 | 7/2008 | Lechine |
| 2009/0012842 A1* | 1/2009 | Srinivasan .......... G06F 16/3344 705/12 |
| 2010/0010655 A1 | 1/2010 | Corcorn et al. |
| 2011/0093465 A1* | 4/2011 | Sporer ................... G06Q 10/00 707/737 |
| 2012/0079912 A1* | 4/2012 | Leone .................. B60K 26/021 74/560 |

OTHER PUBLICATIONS

Verhagen, Wim J.C. et al., "A critical review of knowledge-based engineering: An indentificaiton of research challenges", Adv. Eng. Informatics, 26, 2012, pp. 5-15. (Year: 2012).*

Lee, J..Y. and K. Kim, "Geometric reasoning for knowledge-based parametric design using graph representation", Computer-Aided Design, vol. 26, No. 10, pp. 631-641, 1996. (Year: 1996).*

P. Borst and Akkermans, H., "Engineering ontologies", International Journal of Human-Computer Studies 46, 1997, pp. 365-406. (Year: 1997).*

Shvaiko P, Euzenat J. Ontology matching: state of the art and future challenges. IEEE Transactions on knowledge and data engineering. Dec. 13, 2011; 25(1):158-76. (Year: 2011).*

Chandrasegaran, S. K., Ramani, K., Sriram, R. D., Horváth, I., Bernard, A., Harik, R. F., & Gao, W. (2013). The evolution, challenges, and future of knowledge representation in product design systems. Computer-Aided Design, 45(2), 204-228.

Rocca, G. L. (2012). Knowledge based engineering: Between AI and CAD. Review of a language based technology to support engineering design. Advanced engineering informatics, 26(2), 159-179.

Tomiyama, T. (2007). Intelligent computer-aided design systems: Past 20 years and future 20 years. Artificial Intelligence for Engineering Design, Analysis, and Manufacturing, 21(01), 27-29.

Agichtein, E., & Gravano, L. (2000). Snowball: Extracting relations from large plain-text collections. In the Fifth ACM Conference on Digital Libraries (pp. 85-94). ACM.

Alani, H., Kim, S., Millard, D. E., Weal, M. J., Hall, W., Lewis, P. H., & Shadbolt, N. R. (2003). Automatic ontology-based knowledge extraction from web documents. Intelligent Systems, IEEE, 18(1), 14-21.

Banko, M., Cafarella, M. J., Soderland, S., Broadhead, M., & Etzioni, O. (2007). Open information extraction for the web. In IJCAI, 7, 2670-2676.

Auer, S. & Lehmann, J. (2007). What have Innsbruck and Leipzig in common? Extracting Semantics from Wiki Content. In 4th European Semantic Web Conference.

Suchanek, F., Kasneci, G. & Weikum, G. (2007). YAGO—A core of semantic knowledge. In WWW 2007.

Wu, F., & Weld, D. S. (2010). Open information extraction using Wikipedia. In the 48th Annual Meeting of the Association for Computational Linguistics (pp. 118-127).

Poon, H., & Domingos, P. (2010). Machine reading: A "Killer App" for statistical relational AI. In Statistical Relational Artificial Intelligence.

Carlson, A., Betteridge, J., Kisiel, B., Settles, B., Hruschka Jr, E. R., & Mitchell, T. M. (2010). Toward an Architecture for Never-Ending Language Learning. In AAAI, 5, 3-11.

Fenves, S. J., Foufou, S., Bock, C., & Sriram, R. D. (2008). CPM2: A core model for product data. Journal of Computing and Information Science in Engineering, 8(1), 014501.

Li, Z., & Ramani, K. (2007). Ontology-based design information extraction and retrieval. Artificial Intelligence for Engineering Design, Analysis, and Manufacturing, 21(02), 137-154.

Otto, K.N., & Wood, K.L. (2001). Product Design Techniques in Reverse Engineering and New Product Development. Upper Saddle River, NJ: Prentice Hall.

Gero, J. S. (1990). Design prototypes: a knowledge representation schema for design. AI Magazine, 11(4), 26.

Umeda, Y., Takeda, H., Tomiyama, T., & Yoshikawa, H. (1990). Function, behaviour, and structure. Applications of artificial intelligence in engineering V, 1, 177-194.

Chandrasekaran, B., Goel, A. K., & Iwasaki, Y. (1993). Functional representation as design rationale. Computer, 26(1), 48-56.

Hirtz, J., Stone, R. B., McAdams, D. A., Szykman, S., & Wood, K. L. (2002). A functional basis for engineering design: reconciling and evolving previous efforts Research in Engineering Design, 13(2), 65-82.

Bryant, C. R., McAdams, D. A., Stone, R. B., Kurtoglu, T., & Campbell, M. I. (2005). A computational technique for concept generation. In Proc. of ASME 2005 IDETC/CIE.

Kurtoglu, T., & Campbell, M. I. (2009). Automated synthesis of electromechanical design configurations from empirical analysis of function to form mapping. Journal of Engineering Design, 20(1), 83-104.

Miller, G. A. (1995). WordNet: A Lexical Database for English. Communications of the ACM, 38(11), 39-41.

Mikolov, T., Chen, K., Corrado, G., & Dean, J. (2013). Efficient estimation of word representations in vector space. arXiv:1301.3781.

Goel, A. K. (1997). Design, analogy, and creativity. IEEE expert, 12(3), 62-70.

Stone, R. B., & Wood, K. L. (2000). Development of a functional basis for design. Journal of Mechanical Design, 122 (4), 359-370.

Li, Z., Yang, M. C., & Ramani, K. (2009). A methodology for engineering ontology acquisition and validation. Artificial Intelligence for Engineering Design, Analysis, and Manufacturing, 23(1), 37-51.

Zeng, Y. (2008). Recursive object model (ROM)—Modelling of linguistic information in engineering design. Computers in Industry, 59(6), 612-625.

Shu, L. H. (2010). A natural-language approach to biomimetic design. Artificial Intelligence for Engineering Design, Analysis and Manufacturing, 24(4), 507-519.

Cheong, H., & Shu, L. H. (2014). Retrieving causally related functions from natural-language text for biomimetic design. Journal of Mechanical Design, 136(8), 081008.

Cascini, G., Fantechi, A., & Spinicci, E. (2004). Natural language processing of patents and technical documentation. Document Analysis Systems VI (pp. 508-520). Berlin: Springer.

Murphy, J., Fu, K., Otto, K., Yang, M., Jensen, D., & Wood, K. (2014). Facilitating design-by-analogy: Development of a complete functional vocabulary and functional vector approach to analogical search. In Proc. of ASME 2014 IDETC/CIE.

Rai, R. (Aug. 2012). Identifying key product attributes and their importance levels from online customer reviews. In Proc. of ASME 2012 IDETC/CIE.

Budanitsky, A., & Hirst, G. (2001). Semantic distance in WordNet: An experimental, application-oriented evaluation of five measures. Workshop on WordNet and Other Lexical Resources (vol. 2).

Jiang, J. J., & Conrath, D. W. (1997). Semantic similarity based on corpus statistics and lexical taxonomy. In 10th International Conference on Research in Computational Linguistics, ROCLING'97.

Deerwester, S. C., Dumais, S. T., Landauer, T. K., Furnas, G. W., & Harshman, R. A. (1990). Indexing by latent semantic analysis. JASIS, 41(6), 391-407.

Toutanova, K., & Manning, C. D. (2000). Enriching the knowledge sources used in a maximum entropy part-of speech tagger. In 2000

(56) References Cited

OTHER PUBLICATIONS

Joint SIGDAT Conference on Empirical Methods in Natural Language Processing and Very Large Corpora, vol. 13 (pp. 63-70). ACL.
De Marneffe, M. C., MacCartney, B., & Manning, C. D. (May 2006). Generating typed dependency parses from phrase structure parses. In LREC (vol. 6, pp. 449-454).
Kurtoglu, T., Campbell, M. I., Bryant, C. R., Stone, R. B., & McAdams, D. A. (2005). Deriving a component basis for computational functional synthesis. In ICED 05.
Sen, C., Summers, J. D., & Mocko, G. M. (2011). A protocol to formalize function verbs to support conservation-based model checking. Journal of Engineering Design, 22(11-12), 765-788.
http://www.w3.org/standards/semanticweb/.
http://design.engr.oregonstate.edu/repo.
http://dedialab.di.unipi.it/wiki/Wikipedia_Extractor.
"Sourceforce.net", URL : https ://sourceforge.net/projects/free-cad/files/FreeCAD%20Documentation/,showing freecad-015.pdf, Mar. 21, 2015, 2 pages.
James de St. Germain "Reverse Engineering Utilizing Domain Specific Knowledge", 2002, School of Computing The University of Utah, 125 pages.
FreeCAD, version 0.15, user manual, Mar. 21, 2015, sourceforge.net.
Non-Final Rejection received for U.S. Appl. No. 15/215,510, dated Jul. 18, 2018, 24 pages.
Final Rejection received for U.S. Appl. No. 15/215,510, dated Apr. 18, 2019, 16 pages.
Notice of Allowance received for U.S. Appl. No. 15/215,510, dated Aug. 28, 2019, 14 pages.
Notice of Allowance received for U.S. Appl. No. 15/215,510, dated Dec. 11, 2019, 16 pages.
Non-Final Rejection received for U.S. Appl. No. 15/215,520, dated Sep. 28, 2018, 26 pages.
Final Rejection received for U.S. Appl. No. 15/215,520, dated Feb. 7, 2019, 10 pages.
Non-Final Rejection received for U.S. Appl. No. 15/215,520, dated Jun. 27, 2019, 59 pages.
Final Rejection received for U.S. Appl. No. 15/215,520, dated Nov. 29, 2019, 31 pages.
Li et al., "Semantics-Based Design Knowledge Annotation and Retrieval", Proceedings of IDETC/CIE 2005, DETC2005-85107, 2005, pp. 1-10.
Notice of Allowance received for U.S. Appl. No. 15/215,520, dated Jun. 11, 2020, 19 pages.

* cited by examiner

SYSTEM-LEVEL APPROACH TO GOAL-DRIVEN DESIGN

CROSS-REFERENCE TO RELATED APPLICATIONS

This application claims the benefit of United States provisional patent application titled "Dreamcatcher: System-Level Approach to Goal-Driven Design," filed on Jul. 23, 2015 and having Ser. No. 62/196,264. The subject matter of this related application is hereby incorporated herein by reference.

BACKGROUND OF THE INVENTION

Field of the Invention

Embodiments of the present invention relate generally to computer-aided design and, more specifically, to a system-level approach to goal-driven design.

Description of the Related Art

Engineers often use computer-aided design (CAD) tools to design individual parts of larger systems. For example, an engineer may use a conventional CAD tool to design the chain ring of a bicycle to meet certain design criteria. During the design process, engineers typically employ a workflow that involves formulating the problem to be solved, conceptualizing a potential design, using a CAD tool to generate the design, and then simulating the generated design, via the CAD tool, to determine whether the design criteria have been met.

Returning to the bicycle example, the engineer could first formulate the problem to be solved as the need to transfer torque applied via the bicycle pedals into tension that can be transferred elsewhere. Then, the engineer could conceptualize a potential design that involves a chain ring coupled to a chain that transfers torque from the gear into the chain. The engineer could subsequently use a CAD tool to generate a specific design for the chain ring. Finally, the engineer could use a simulation package included in the CAD tool to simulate the design. This general approach to design suffers from several problems.

First, conventional CAD tools usually can only be used to design individual parts. However, the design criteria associated with each part are usually constrained by other parts in the overall system. In the bicycle example, the particular length of each gear tooth in the chain ring would be constrained by the anticipated amount of torque needed to be transferred to the chain, which, in turn, would be driven by the crankshaft length. Conventional CAD tools generally do not account for the system-level context within which each individual part resides.

Second, conventional CAD tools usually require the engineer to design each individual component of a system and then assemble those components together, even when the ultimate assembly falls within a well-known class of structures. In the bicycle example, the engineer would be required to design the chain ring, the crankshafts, the pedals, and the chain and then physically organize those components into the desired system-level configuration. However, bicycle chain assemblies are well known bicycle systems. Consequently, the conventional design approach requires needless repetition of known tasks.

Finally, despite the fact that centuries of engineering knowledge exists, conventional CAD tools have no way to draw from this knowledge base for the benefit of the current designer or engineer. In the bicycle chain ring example, the designer or engineer would be required to design each individual gear tooth, despite the fact that gears and gear teeth are well-known constructs for which there are numerous pre-existing deigns. Having to re-design well understood elements can lead to extended design times and increased frustration on the part of designers and engineers.

In sum, conventional CAD tools (i) are only applicable to individual parts, (ii) cannot configure assemblies of parts in meaningful ways, and (iii) cannot benefit from available engineering knowledge.

As the foregoing illustrates, what is needed in the art are more effective approaches to generating system-level designs.

SUMMARY OF THE INVENTION

Various embodiments of the present invention set forth a computer-implemented method for generating a knowledge base, including extracting a first text segment from a corpora that describe one or more systems, applying a set of syntactic parsing rules to the first text segment to generate a first parsed text segment, and generating, based on the first parsed text segment, a first knowledge model element that indicates a first relationship between a first plurality of components of a first system.

At least one advantage of the techniques described herein is that the knowledge base can be generated from a wealth of engineering knowledge included in the vast technical corpora available, making this engineering knowledge directly accessible to engineers during the design process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
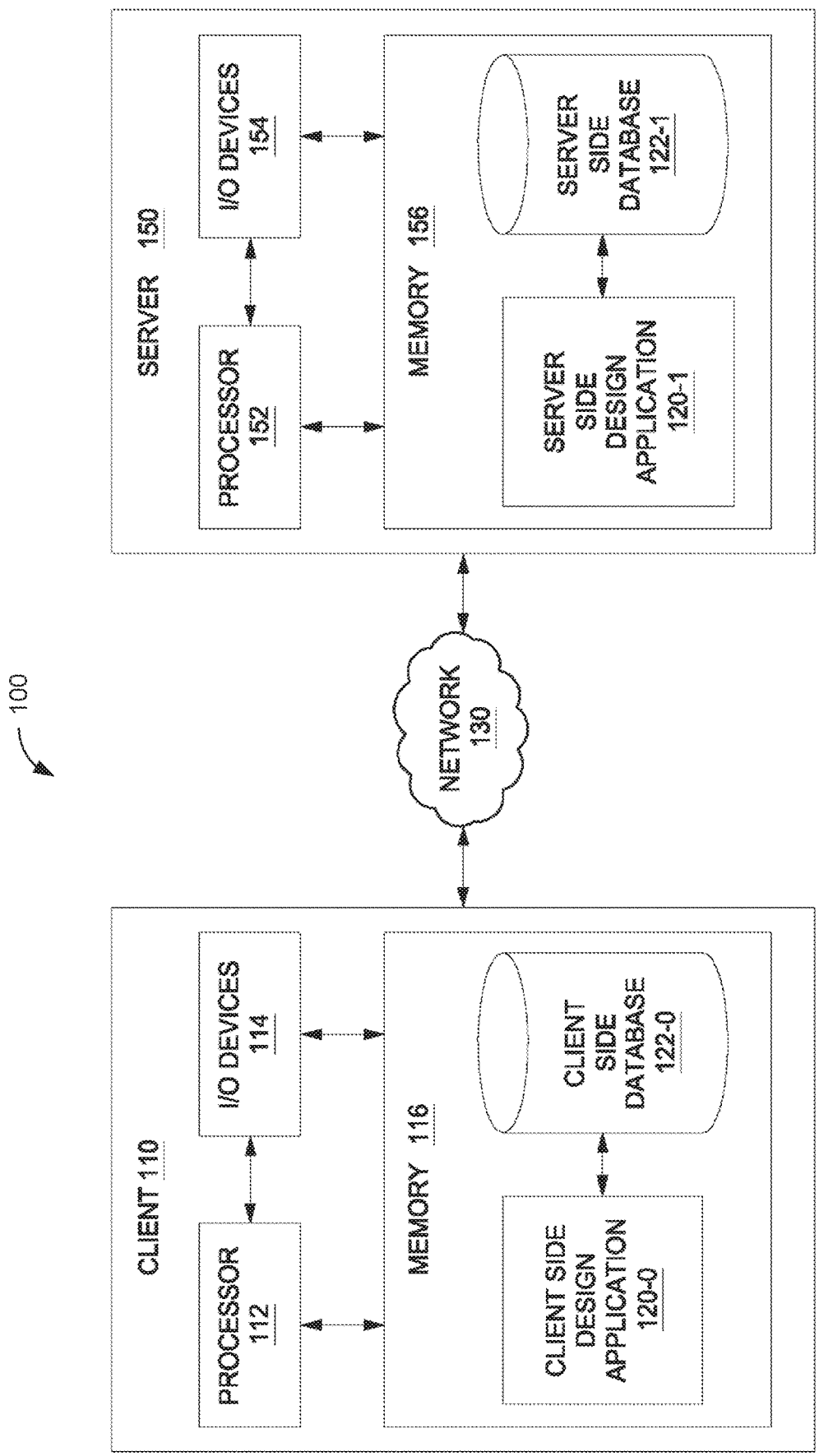
FIG. 1 illustrates a system configured to implement one or more aspects of the present invention.

FIG. 1 illustrates a system 100 configured to implement one or more aspects of the present invention. As shown, system 100 includes, without limitation, a client 110 coupled via a network 130 to a server 150. Client 110 may be any technically feasible variety of client computing device, including a desktop computer, laptop computer, mobile device, and so forth. Network 130 may be any technically feasible set of interconnected communication links, including a local area network (LAN), wide area network (WAN), the World Wide Web, or the Internet, among others. Server 150 may be any technically feasible type of server computing device, including a remote virtualized instance of a computing device, one or more physical cloud-based computing devices, a portion of a datacenter, and so forth.

Client 110 includes processor 112, input/output (I/O) devices 114, and memory 116, coupled together. Processor 112 may be any technically feasible form of processing device configured process data and execute program code. Processor 112 could be, for example, a central processing unit (CPU), a graphics processing unit (GPU), an application-specific integrated circuit (ASIC), a field-programmable gate array (FPGA), and so forth. I/O devices 114 may include devices configured to receive input, including, for example, a keyboard, a mouse, and so forth. I/O devices 114 may also include devices configured to provide output, including, for example, a display device, a speaker, and so forth. I/O devices 114 may further include devices configured to both receive and provide input and output, respectively, including, for example, a touchscreen, a universal serial bus (USB) port, and so forth.

Memory 116 may be any technically feasible storage medium configured to store data and software applications. Memory 116 could be, for example, a hard disk, a random access memory (RAM) module, a read-only memory (ROM), and so forth. Memory 116 includes client-side design application 120-0 and client-side database 122-0. Client-side design application 120-0 is a software application that, when executed by processor 112, causes processor 112 to optimize a design of a system. In doing so, client-side design application 120-0 may store and update data within client-side database 122-0. Such operations may be implemented via computer-aided design (CAD) tools provided by client-side design application 120-0, or via tools provided by other software applications. Client-side design application 120-0 may also interoperate with a corresponding design application that resides within server 150, and access a database that also resides on server 150, as described in greater detail below.

Server 150 includes processor 152, I/O devices 154, and memory 156, coupled together. Processor 152 may be any technically feasible form of processing device configured process data and execute program code, including a CPU, a GPU, an ASIC, an FPGA, and so forth. I/O devices 154 may include devices configured to receive input, devices configured to provide output, and devices configured to both receive and provide input and output.

Memory 156 may be any technically feasible storage medium configured to store data and software applications, including a hard disk, a RAM module, a ROM, and so forth. Memory 156 includes server-side design application 120-1 and server-side database 122-1. Server-side design application 120-1 is a software application that, when executed by processor 152, causes processor 152 to optimize a design of a system. In doing so, server-side design application 120-1 may store and update data within server-side database 122-1. Such operations may be implemented via CAD tools provided by server-side design application 120-1 or other types of tools. Server-side design application 120-1 may also interoperate with client-side design application 120-0, and access database 122-0.

In operation, client-side design application 120-0 and server-side design application 120-1 interoperate with one another to implement any and all of the inventive operations described herein. In doing so, either one or both of client-side design application 120-0 and server-side design application 120-1 may access either one or both of client-side database 122-0 and server-side database 122-1. Generally, client-side design application 120-0 and server-side design application 120-1 represent different portions of single distributed software entity. Thus, for simplicity, client-side design application 120-0 and server-side design application 120-1 will be referred to collectively as design application 120. Similarly, client-side database 122-0 and server-side database 122-1 represent different portions of a single distributed storage entity. Therefore, for simplicity, client-side database 122-0 and server-side database 122-1 will be referred to collectively as database 122. Design application 120 and database 122 are described in greater detail below in conjunction with FIG. 2.

Figure 2:
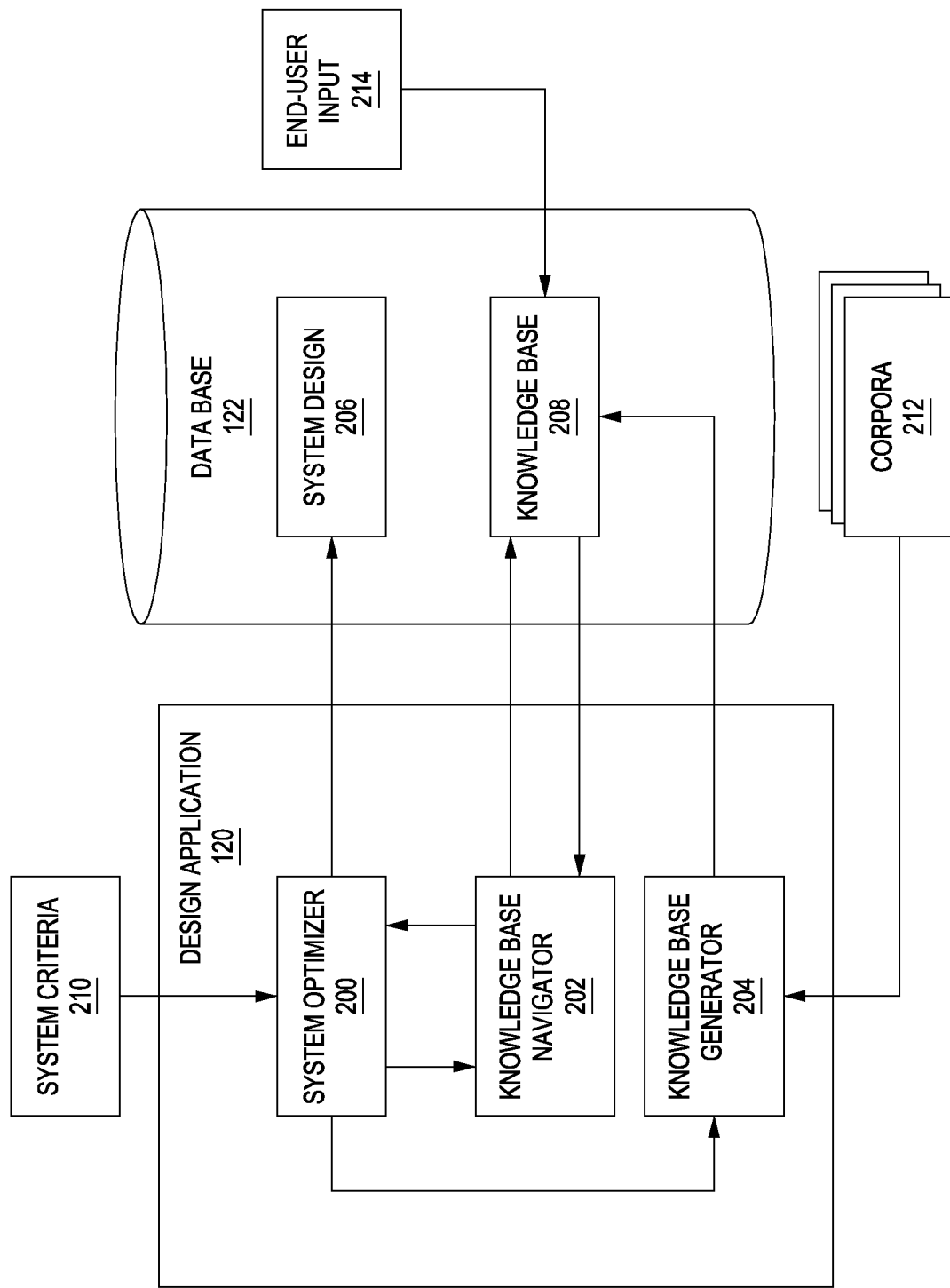
FIG. 2 is a more detailed illustration of the design application of FIG. 1, according to various embodiments of the present invention.

FIG. 2 is a more detailed illustration of the design application of FIG. 1, according to various embodiments of the present invention. As shown, design application 120 includes a system optimizer 200, a knowledge base navigator 202, and a knowledge base generator 204. As also shown, database 122 incudes a system design 206 and a knowledge base 208.

System optimizer 200 is a software module that is configured to receive and process system criteria 210 to generate system design 206. System criteria 210 include various design objectives, design constraints, and boundary conditions associated with a system to be generated. These criteria may be component-level criteria that constrain specific components within the system to be generated, or system-level criteria that constrain the system as a whole. System design 206 is a CAD model of a set of interconnected and interoperational components that meet the component-level and system-level objectives, constraints, and boundary conditions included in system criteria 210. System optimizer 200 is described in greater detail below in conjunction with FIGS. 3-6.

Knowledge base navigator 202 is a software module that is configured to navigate knowledge base 208. Knowledge base 208 includes a collection of taxonomic, structural, and functional models of a wide variety of different systems, as well as three-dimensional geometries associated with some or all of those different systems. System optimizer 200 may use these models and associated system geometries as templates to initiate the design process. Knowledge base navigator 202 is configured to identify system templates within knowledge base 208 that may be relevant to system optimizer 200 in generating system design 206. Knowledge base navigator 202 is described in greater detail below in conjunction with FIGS. 7-13

Knowledge base generator 204 is a software module that is configured to generate knowledge base 208 by processing corpora 212 and/or responding to manual configurations received via end-user input 214. Corpora 212 includes one or more engineering texts that describe a variety of different engineering systems, including mechanical, electrical, hydraulic, and structural systems, among others. Knowledge base generator 204 processes corpora 212 to extract taxonomic, structural, and functional information that can be used to generate system templates for inclusion in knowledge base 208. Knowledge base generator 204 is described in greater detail below in conjunction with FIGS. 14-18.

System-Level Design Optimization

Figure 3:
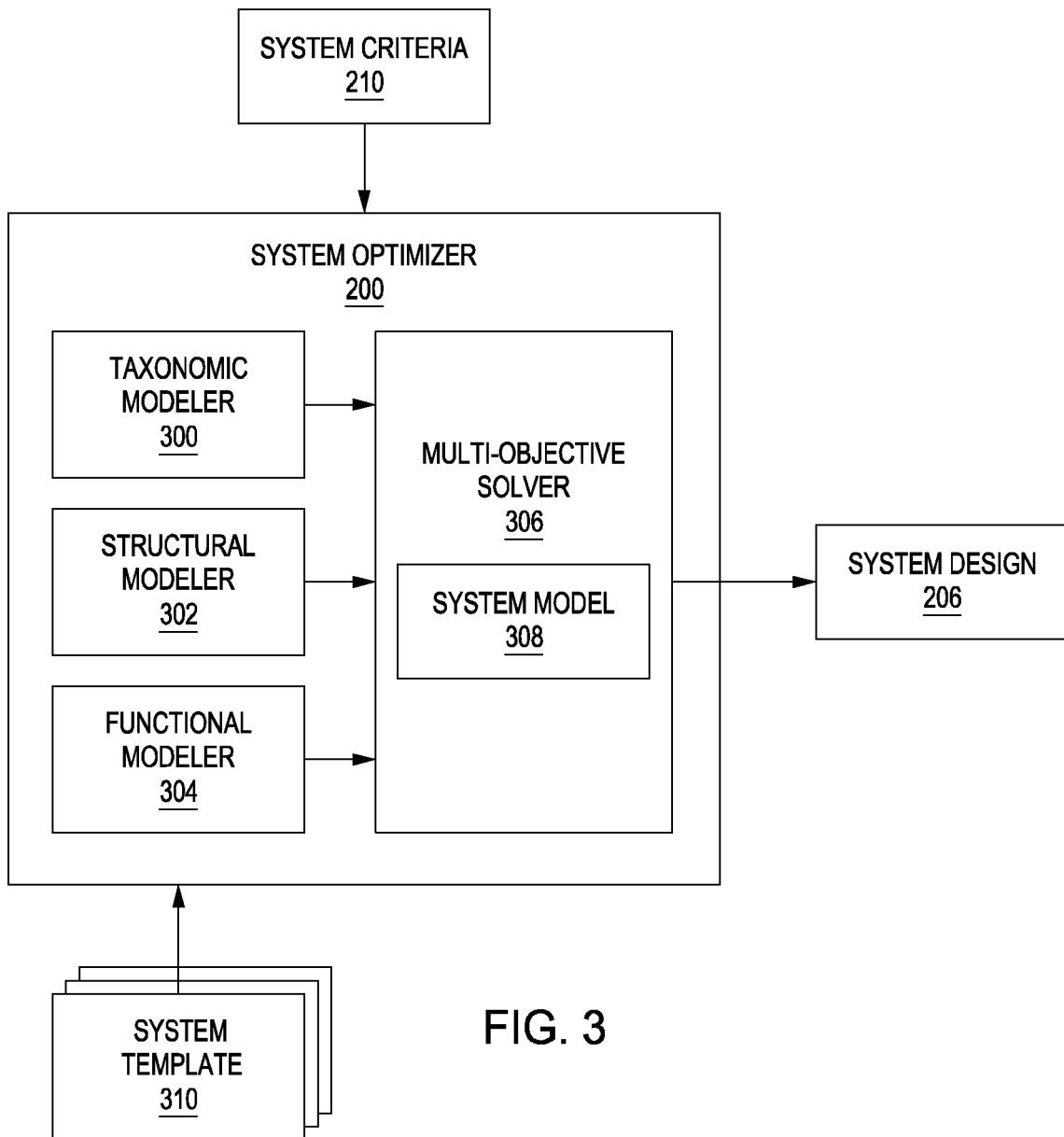
FIG. 3 is a more detailed illustration of the system optimizer of FIG. 2, according to various embodiments of the present invention.

FIG. 3 is a more detailed illustration of the system optimizer 200 of FIG. 2, according to various embodiments of the present invention. As shown, system optimizer 200 includes a taxonomic modeler 300, a structural modeler 302, and a functional modeler 304, coupled respectively to a multi-objective solver 306. Multi-objective solver 306 includes a system model 308.

System optimizer 200 is generally configured to generate system design 206 by iteratively optimizing the topology or geometry of each individual component included in system design 206. In doing so, system optimizer 200 receives system criteria 210 and system templates 310 and then generates system model 308 via interoperation of taxonomic modeler 300, structural modeler 302, and functional modeler 304. System model 308 is an intermediate version of system design 206 that may (or may not) include specific geometry that meets system criteria 210 at any given time during the design process.

As mentioned above, system criteria 210 include component-level and system-level design objectives, design constraints, and boundary conditions associated with the target system to be generated. For example the component-level criteria could include a force that should be exerted by one component on a neighboring component, or a type of connection between two components, while the system-level criteria could include a total mass of the target system or a total cost of the target system. System design 206 includes one or more designs that meet all of these global and local objectives, constraints, and boundary conditions.

Taxonomic modeler 300 is a software module configured to generate a taxonomic model of a target system that is at least partially described by system criteria 210. For example, system criteria 210 could specify that the target design should include a crankshaft having four crankpins. Taxonomic modeler 300 would distill this description into a taxonomic model of the target system. Taxonomic models are discussed in detail in conjunction with FIG. 9. Knowledge base navigator 202 shown in FIG. 2 can use taxonomic models generated in this fashion to extract system templates 310 from knowledge base 208. System templates 310 set forth one or more systems (and, potentially, corresponding geometries) that may have similar taxonomic properties as the target system described in system criteria 210. In the crankshaft example describe above, a given system template 310 could include geometry related to a four-crankpin crankshaft, similar to that described in system criteria 210. System model 308 may be derived, at least in part, from one or more system templates 310.

Structural modeler 302 is a software module configured to generate a structural model of the target system described via system criteria 210. For example, system criteria 210 could include a design space that specifies one or more physical constraints imposed between components of the target system. Structural modeler 302 could interpret the design space to generate a structural model that respects these constraints. At least a portion of system model 308 may be derived from the structural model generated by structural modeler 302 or from a system template 310 located based on that structural model.

Functional modeler 304 is a software module configured to generate a functional model of the target system described via system criteria 210. For example, system criteria 210 could include a design space that specifies one or more transferences of force between two components of the target system. These transferences of force would represent functions performed by the target system. Functional modeler 304 could interpret the design space to generate a functional model that implements these force transferences. At least a portion of system model 308 may be derived from the functional model generated by functional modeler 304 or from a system template 310 located based on that functional model.

Multi-objective solver 306 is configured to iteratively solve one or more objective functions to generate, adjust, and optimize various structural and functional attributes of system model 308. Multi-objective solver 306 operates in this manner until producing system design 206, which meets system criteria 210. During the solving process, multi-objective solver 306 generates structural and functional geometry for system design 206, or improves upon geometry derived from a system template 310, by iteratively applying a topology generation and optimization procedure.

Figure 4:
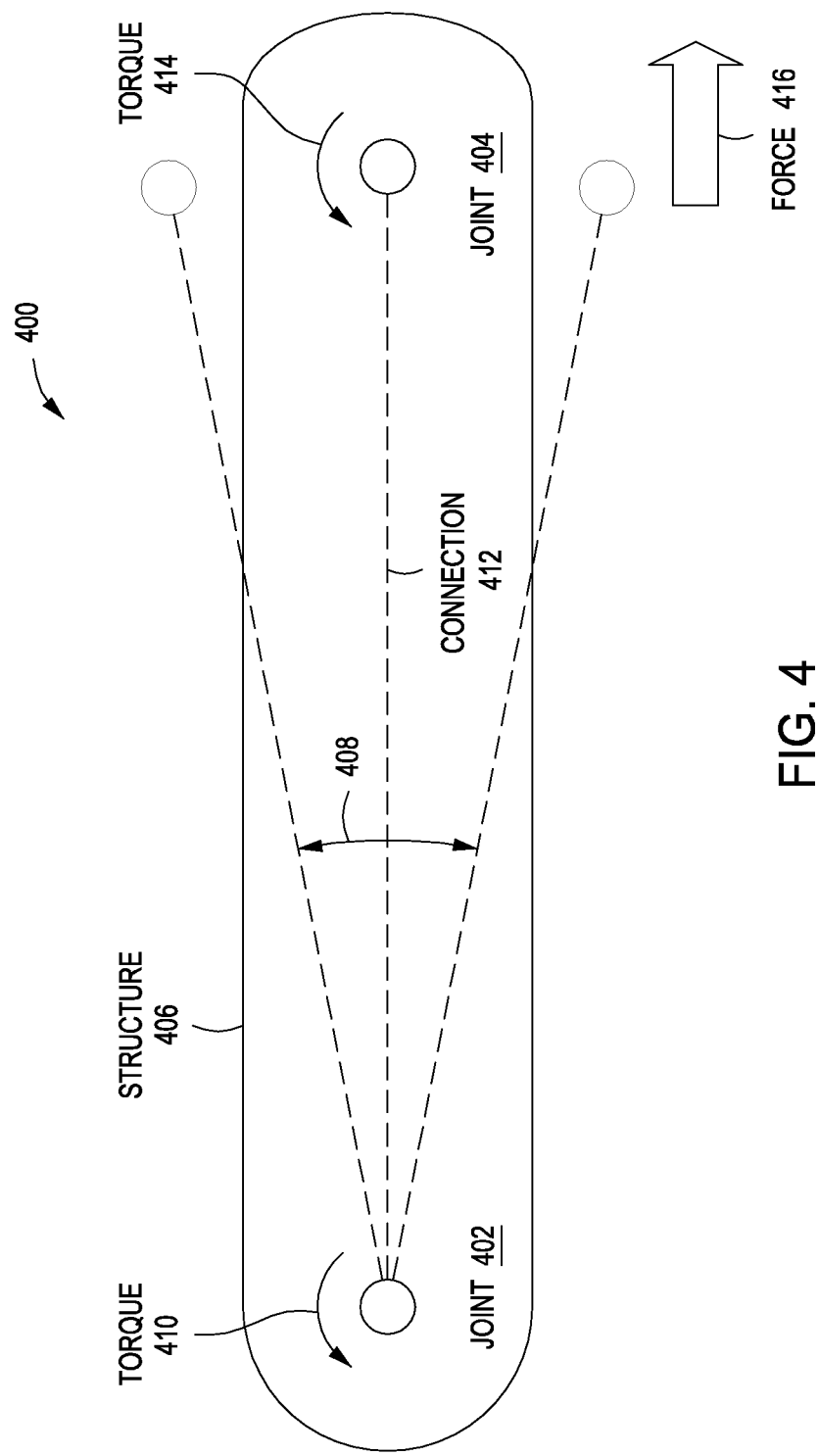
FIG. 4 illustrates a system model that is processed by the system optimizer of FIG. 3 to generate a system design, according to various embodiments of the present invention.
Figure 5:
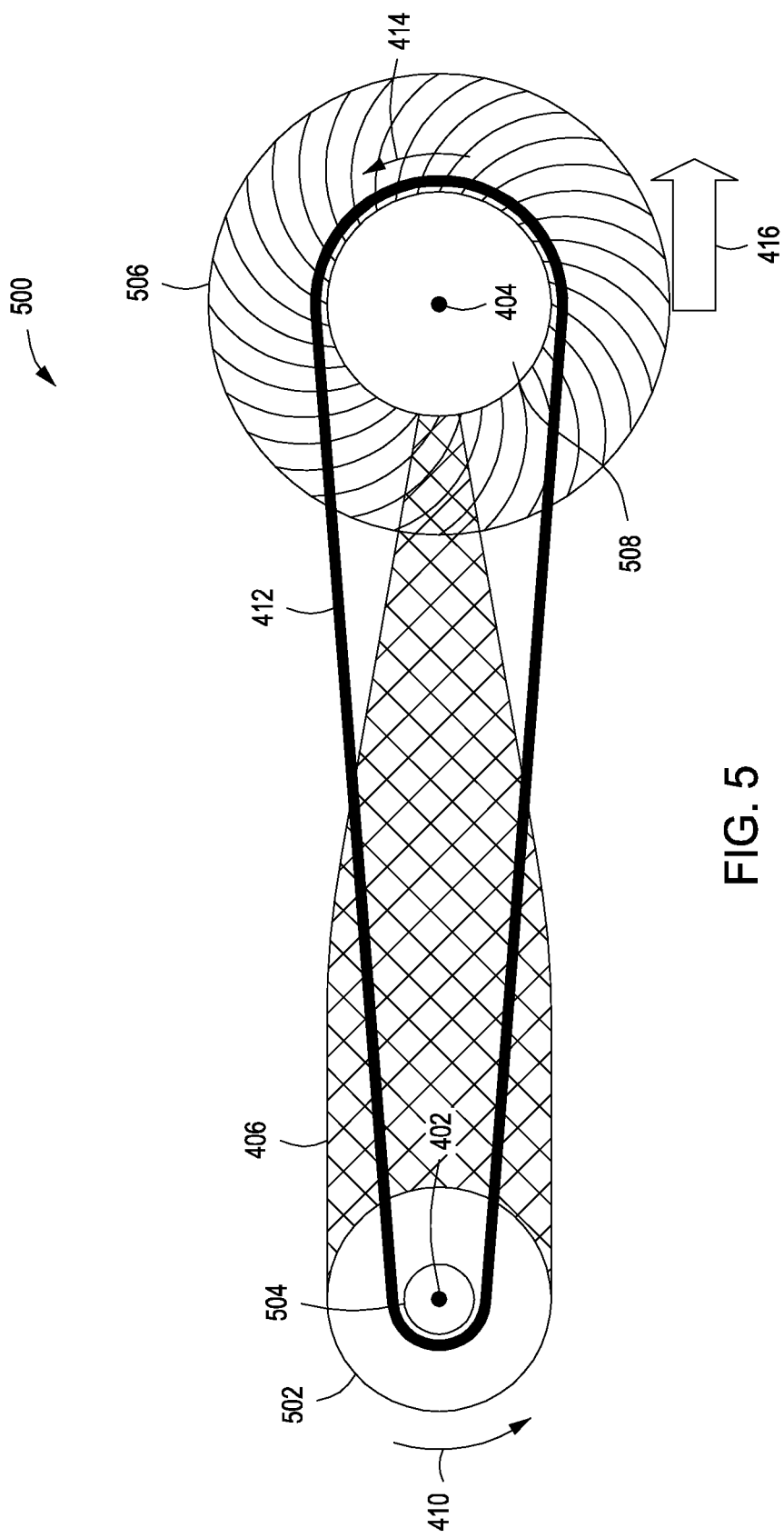
FIG. 5 illustrates how the system optimizer of FIG. 3 processes the system criteria of FIG. 4 to generate a system design, according to various embodiments of the present invention.

In doing so, multi-objective solver 306 performs various component-level optimizations to generate geometry for each individual component of system model 308, relative to local objectives, constraints, and boundary conditions associated with each such component and relative to other components in the overall system. Multi-objective solver 306 may also perform a system-level optimization to generate component geometry in a manner that observes global objectives, constraints, and boundary conditions. In this fashion, multi-objective solver 306 generates system design 206 to meet system criteria 210. FIGS. 4-5 illustrate, by way of example, how multi-objective solver 306 performs component-level and system-level optimizations to generate a system design.

FIG. 4 illustrates a system model that is processed by the system optimizer of FIG. 3 to generate a system design, according to various embodiments of the present invention. In the example discussed herein, the basic design objective is the creation of a design for a motorcycle swingarm and various connected components.

As shown, a system model 400 includes a joint 402 and a joint 404. Joints 402 and 404 represent regions of system model 400 that should be capable of supporting rotational loads. Thus, joints 402 and 404 represent one type of boundary condition. Joints 402 and 404 are coupled together by structure 406. Structure 406 may not have a definite geometry as of yet because structure 406 merely represents the constraint that joints 402 and 404 must be physically joined together somehow. An angular constraint 408 indicates that joint 404 must be capable of rotating around joint 402 by a certain number of degrees. Torque 410 is applied to joint 402 and must be transferred to joint 404, via connection 412, to provide torque 414. Torques 410 and 414 thus represent a form of design objective, while connection 412 represents a form of design constraint. Force 416 is another variety of design objective, which indicates that system model 400 as a whole must somehow generate force 416.

As a general matter, system model 400 represents a starting point for system optimizer 200 to generate system design 206 via one or more iterations of multi-objective solver 306, as mentioned above. Thus, system model 400 may not completely specify the particular geometry needed to meet the various criteria set forth in design criteria 210. However, system model 400 may specify certain known structural or functional attributes of system design 206, which of course may vary on a case-by-case basis. In one embodiment, system model 400 is derived from a system template 310 extracted from knowledge base 208. This system template could be extracted from knowledge base 208 based on taxonomic, structural, or functional models associated with system model 308 and/or system criteria 210 and may include partial or complete geometry for a system. As described in greater detail below in conjunction with FIG. 5, system optimizer 200 is configured to generate geometry for system model 400 that satisfies the design objectives, constraints, and boundary conditions corresponding to system model 308.

FIG. 5 illustrates how the system optimizer of FIG. 3 processes the system model of FIG. 4 to generate a system design, according to various embodiments of the present invention. As shown, system design 500 includes geometry for various interconnected components that, taken together, satisfy the component-level and system-level criteria associated with system model 400 discussed above in conjunction with FIG. 4. In particular, system design 500 includes a motor 502 that is coupled to a hub 504 concentrically disposed relative to joint 402. System design 500 also includes a wheel 506 which includes a hub 508 concentrically disposed relative to joint 404. System design 500 further includes structure 406 and connection 412, now shown with constrained geometry.

Multi-objective solver 306 includes motor 502 within system design 206 in order to generate torque 410 relative to joint 402. Multi-objective solver 306 also generates connection 412 within system design 206 with particular geometry that is capable of transferring torque between hubs 504 and 508, thereby allowing wheel 506 to generate force 416. Additionally, multi-objective solver 306 creates structure 406 to have a geometry that is capable of supporting the transference of torque 410 between hubs 504 and 508, respectively, and produces wheel 506 and hub 508 to facilitate the conversion of torque 414 into force 416.

Generally, multi-objective solver 306 generates system design 306 by iteratively optimizing each of the aforesaid components to meet the various system criteria 210. Multi-objective solver 306 may generate and optimize a single component first and then generate and optimize related components constrained by the design of the first component. Multi-objective solver 306 may also iteratively generate and optimize all components together.

In practice, multi-objective solver 306 may iteratively evaluate one or more objective functions and execute various topology generation procedures in order to generate the various structures with corresponding functions discussed herein. Multi-objective solver 306 may also adjust the connectivity between components, the particular disposition of each component relative to others, the materials potentially used for each component, and other attributes of system model 500 until system criteria 210 are met. Once system design 206 is generated, that design may be stored in knowledge base 208 along with corresponding taxonomic, structural, and functional models, thereby expanding knowledge base 208. FIGS. 14-18 outline the general approach to generating knowledge base 208.

Multi-objective solver 306 may be applied to optimize the geometry of individual components, such as connection 412, given a set of component-level constraints. For example, one component-level constraint could require that joints 402 and 404 be a fixed distance apart, which would limit the geometry that multi-objective solver 306 can implement for connection 412. Once multi-objective solver 306 has generated geometry for a particular component, given relevant component-level constraints, multi-objective solver 306 may then iteratively re-evaluate one or more objective functions and determine whether any other components can be generated. In the above example, once the geometry of connection 412 is determined, multi-objective solver 306 could then dimension wheel 506 and hub 508 to ensure that wheel 506 exerts force 416. In general, the addition of new design information to system model 500, either via topology generation or end-user provided input, triggers multi-objective solver 306 to generate additional geometry for system model 500 that is based on that new design information.

Multi-objective solver 306 may also generate multiple alternative component designs, each of which may meet the system criteria. For example, the system criteria may specify that connection 412 must transfer torque from joint 402 to joint 404. Because both chain-type connections and belt-type connections can transfer torque, multi-objective solver 306 may provide specific designs of both of these connection mechanisms, each of which meets system criteria 210.

In some cases, multi-objective solver 306 may optimize the geometry and other attributes of multiple components simultaneously. For example, multi-objective solver 306 could dimension and select materials for structure 406 in conjunction with dimensioning and selecting materials for hub 508. The particular choice of geometry and material for structure 406 would reflect the need for this component to support certain loads. Those particular loads, in turn, would be dictated by the choice of geometry and/or materials selected for hub 508. In general, multi-objective solver 306 may perform an iterative optimization process with subgroups of components within system model 500, and then perform further iterative optimization processes with system model 500 as a whole once those subgroups are refined and/or defined.

Referring generally to FIGS. 3-5, system optimizer 200 is configured to perform a system-level optimization in order to generate geometry for a collection of interacting components. Those components may be mechanical components, although system optimizer 200 may generate any technically feasible type of system. In addition, system optimizer 200 may operate based on system criteria 210 having any level of detail. Generally, system criteria 210 may partially or completely define a system, and system optimizer 200 may in turn generate a system design 206 having a consummate level of detail. The operation of system optimizer 200 is described in stepwise fashion below in conjunction with FIG. 6.

Figure 6:
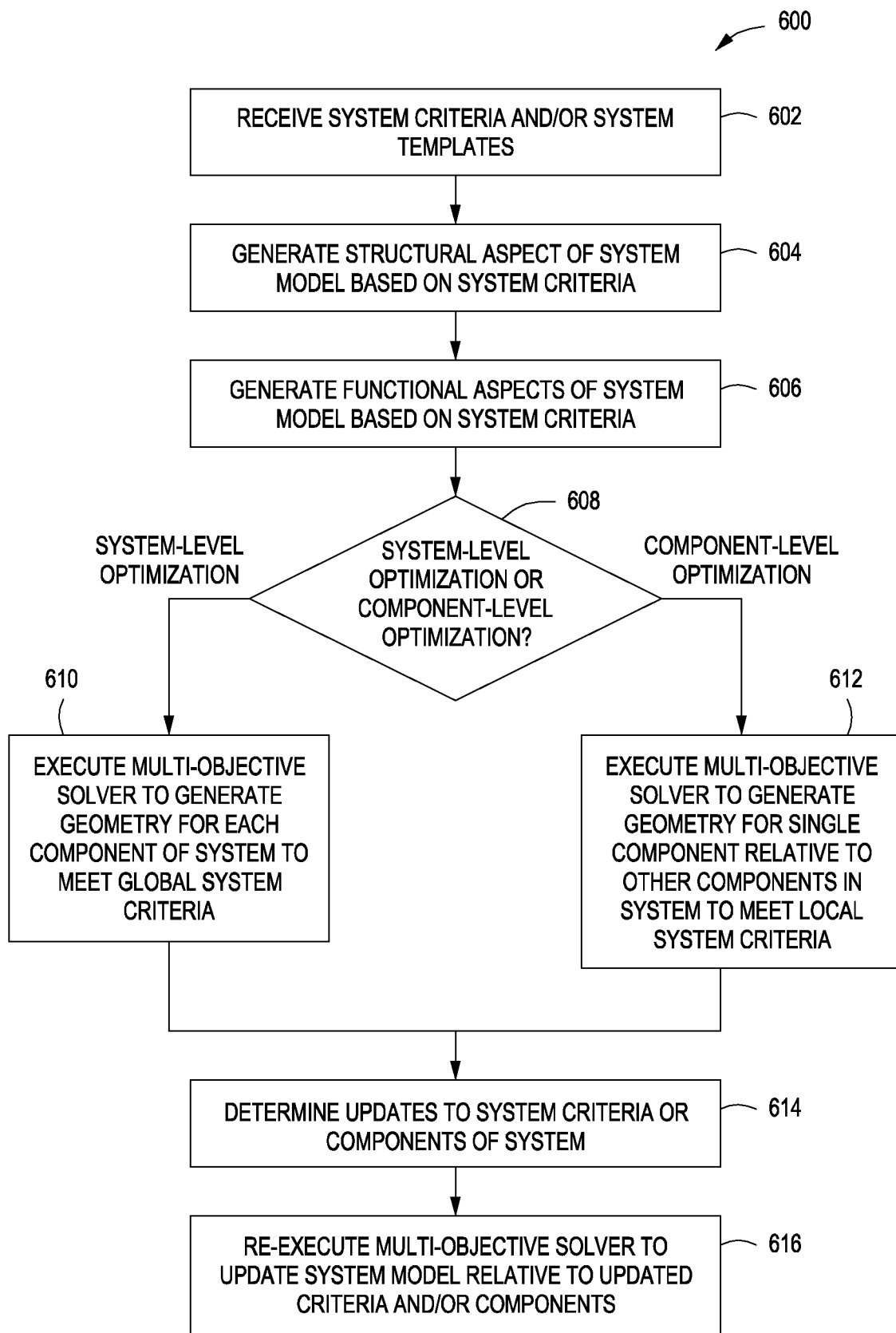
FIG. 6 is a flow diagram of method steps for generating a system design that meets a set of system-level design criteria, according to various embodiments of the present invention.

FIG. 6 is a flow diagram of method steps for generating a system design that meets a set of system-level design criteria, according to various embodiments of the present invention. Although the method steps are described in conjunction with the systems of FIGS. 1-5, persons skilled in the art will understand that any system configured to perform the method steps, in any order, is within the scope of the present invention.

As shown, a method 600 begins at step 602, where system optimizer 200 receives system criteria 210 and/or system templates 310. System criteria 210 include various design objectives, design constraints, and boundary conditions associated with a target system to be designed. System templates 310 set forth one or more systems that may have similar taxonomic properties as the target system described in system criteria 210.

At step 604, structural modeler 302 generates a structural aspect of system model 308. The structural aspect of system model 308 may reflect the structure of one or more systems defined in system templates 310 and/or a structure generated, via multi-objective solver 306, to satisfy system criteria 210. At step 606, functional modeler 304 generates a functional aspect of system model 308. The functional aspect of system model 308 may reflect the function of one or more systems defined in system templates 310 and generally represents the transference of forces within system model 308. In relation to steps 604 and 606, system templates 310 may be extracted from knowledge base 208 based on processing performed by taxonomic modeler 300, as described above in conjunction with FIG. 3 and as described in greater detail below in conjunction with FIGS. 7-12.

At step 608, system-optimizer 200 determines whether a system-level optimization should be performed or a component-level optimization. If a system-level optimization is to be performed, then the method 600 proceeds to step 610, where system optimizer 200 executes multi-objective solver 306 to generate geometry for each component of the target system in order to meet all criteria set forth in design criteria 210. If a component-level optimization is to be performed, then the method 600 proceeds to step 612, where system optimizer 200 executes multi-objective solver 306 to generate geometry for a single component of the target system, relative to other components in the system, in order to meet the locally-relevant criteria set forth in design criteria 210. In addition to steps 610 and 612, system optimizer 200 may also execute multi-objective solver 306 to optimize subgroups of system components, as described in conjunction with FIG. 5.

At step 614, system optimizer 200 determines whether any updates have been applied to the system criteria 210 and/or components of system model 308. The end-user may update system criteria 210 to further constrain the target system, or the end-user may adjust attributes of system model 308. Alternatively, multi-objective solver 306 may generate geometry, via one or more optimization iterations, that constraints the target system to a point where additional geometry can then be created.

At step 616, system optimizer 200 re-executes multi-objective solver 306 to update system model 308 relative to updated system criteria 210 and/or updated components of system model 308. In this manner, system optimizer 200 may repeatedly iterate multi-objective solver 306 based on updated information received from the end-user or generated by previous iterations of multi-objective solver 306.

One advantage of system optimizer 200 described thus far is that complex systems of interconnected and interacting components can be optimized based on global system criteria applied to the system as a whole and/or localized system criteria associated with individual components. When generating such a system, system optimizer 200 may rely on a knowledge base to provide system templates for jump-starting the design process, as described in greater detail below in conjunction with FIGS. 7-13.

Design Optimization Using a Knowledge Base

Figure 7:
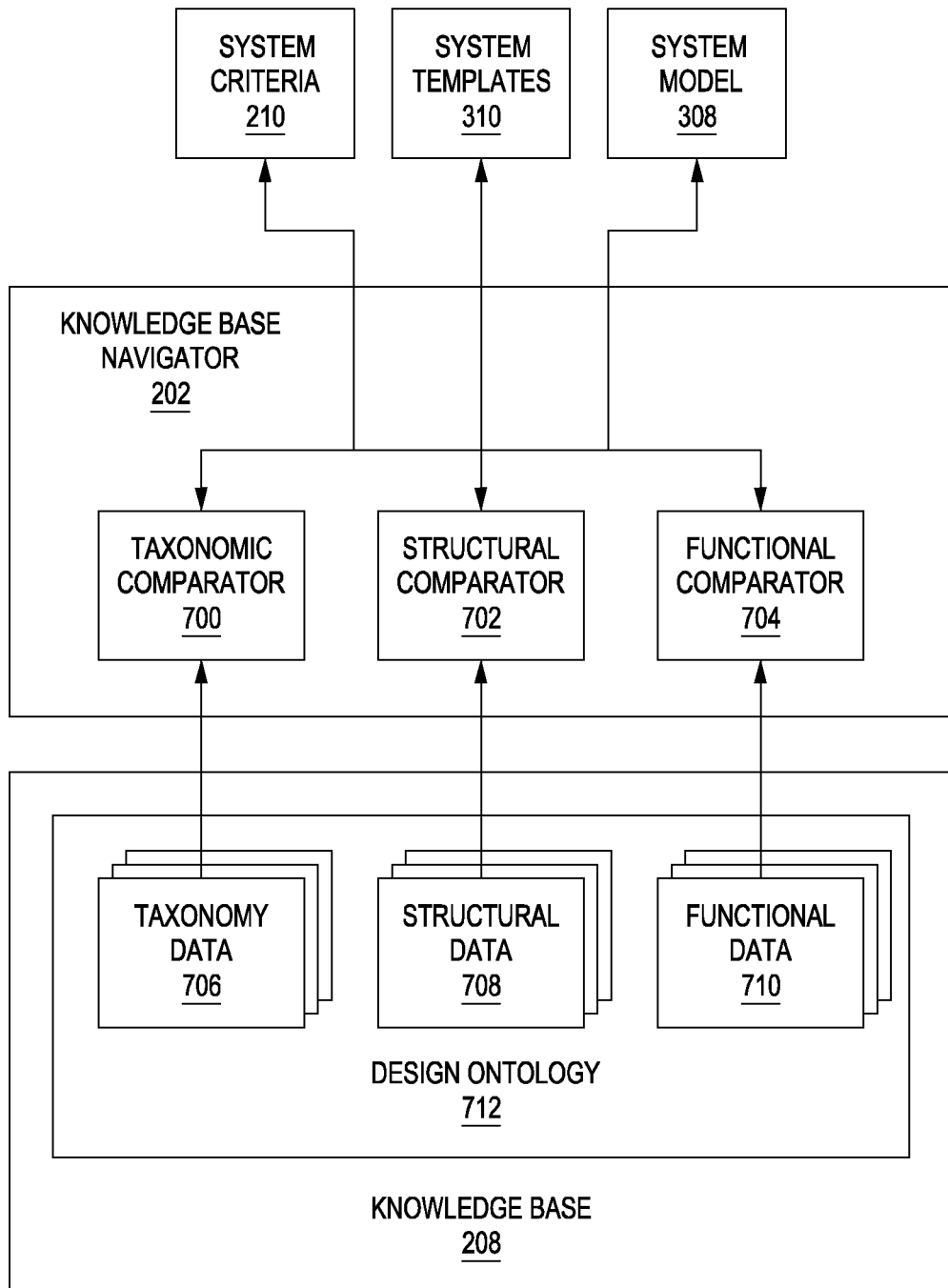
FIG. 7 is a more detailed illustration of the knowledge base navigator of FIG. 2, according to various embodiments of the present invention.

FIG. 7 is a more detailed illustration of the knowledge base navigator of FIG. 2, according to various embodiments of the present invention. As shown, knowledge base navigator 202 includes a taxonomic comparator 700, a structural comparator 702, and a functional comparator 704. Knowledge base 208 includes taxonomy data 706, structural data 708, and functional data 710 included within design ontology 712. Taxonomy data 706, structural data 708, and functional data 710 include different types of models of various engineering systems. These models may correspond to specific system geometry and are described in greater detail below and in conjunction with FIGS. 8-12.

Design ontology 712 is a schema for storing model data, and potentially geometry, associated with the various engineering systems. Additionally, design ontology 712 is a definition of a set of primitive design concepts, properties, and relationships for constructing structural and functional design knowledge corresponding to a design taxonomy.

Figure 8:
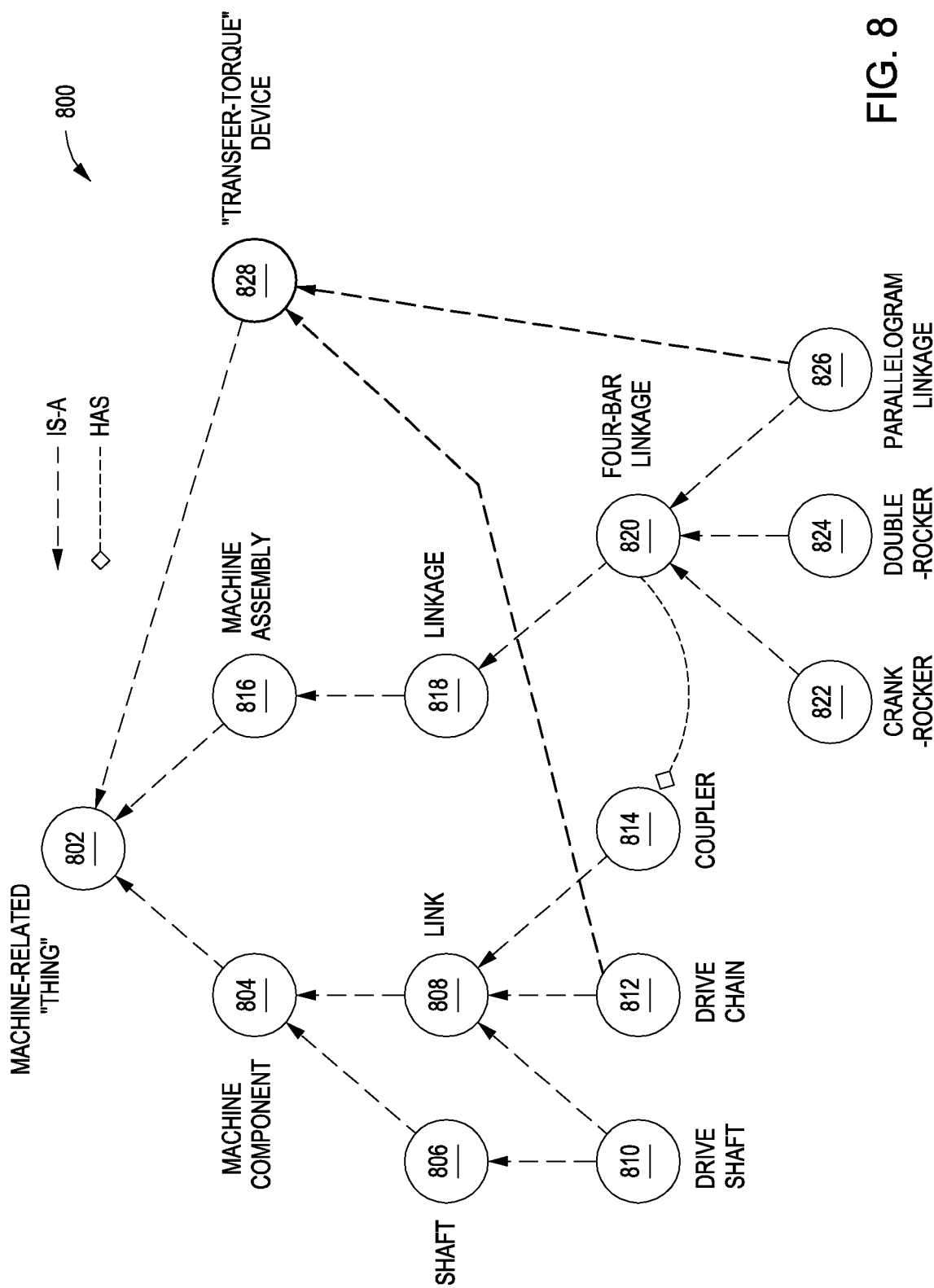
FIG. 8 illustrates a taxonomy model of a system stored within the knowledge base of FIG. 2, according to various embodiments of the present invention.

Taxonomy data 706 includes taxonomic models of engineering systems. In the context of this disclosure, a "taxonomic model" refers to a network of component nodes connected by linguistic relationships, such as "is a" or "has a," among others. For example, a taxonomic model of an engine could include components "cylinder" and "piston" connected by the relationship "has a," which could be interpreted as "a cylinder has a piston." Many such taxonomic relationships can be aggregated to describe an entire engineering system. FIG. 8 describes a complex taxonomic model in greater detail.

Referring now to FIG. 8, as shown, an exemplary taxonomic model 800 includes nodes 802, 804, 806, 808, 810, 812, 814, 816, 818, 820, 822, 824, 826, and 828 coupled together by "is a" and "has a" taxonomic relationships. Each node corresponds to a different component of a system. In this example, the overarching system is a motorcycle having a variety of different components, the names of which are shown in FIG. 8 but omitted here, to a large extent, for brevity. In some cases, nodes that represent alternative functions are shown. For example, crank rocker node 822 and double rocker node 824 represent alternative components that fall within the parent class defined by four-bar linkage node 820.

Referring back now to FIG. 7, taxonomic data 706 may include taxonomic models, such as that described in conjunction with FIG. 8, associated with a wide variety of different systems. Taxonomic comparator 700 is configured to process system criteria 210 to identify various taxonomic relationships present in those criteria, and to then identify, within taxonomic data 706, any taxonomic models that may be similar. For example, if system criteria 210 specified that the target system should include a four-bar linkage that has a coupler, then taxonomic comparator 700 would identify that taxonomic model 800, discussed above, does indeed include such a taxonomic relationship, meaning that this particular model is relevant to the target system associated with system criteria 210 by virtue of having similar taxonomic attributes. Taxonomic comparator 700 would then extract the system associated with the taxonomic data, including any related structural and/or functional models (described below), for inclusion into system templates 310 and/or system model 308.

Figure 9:
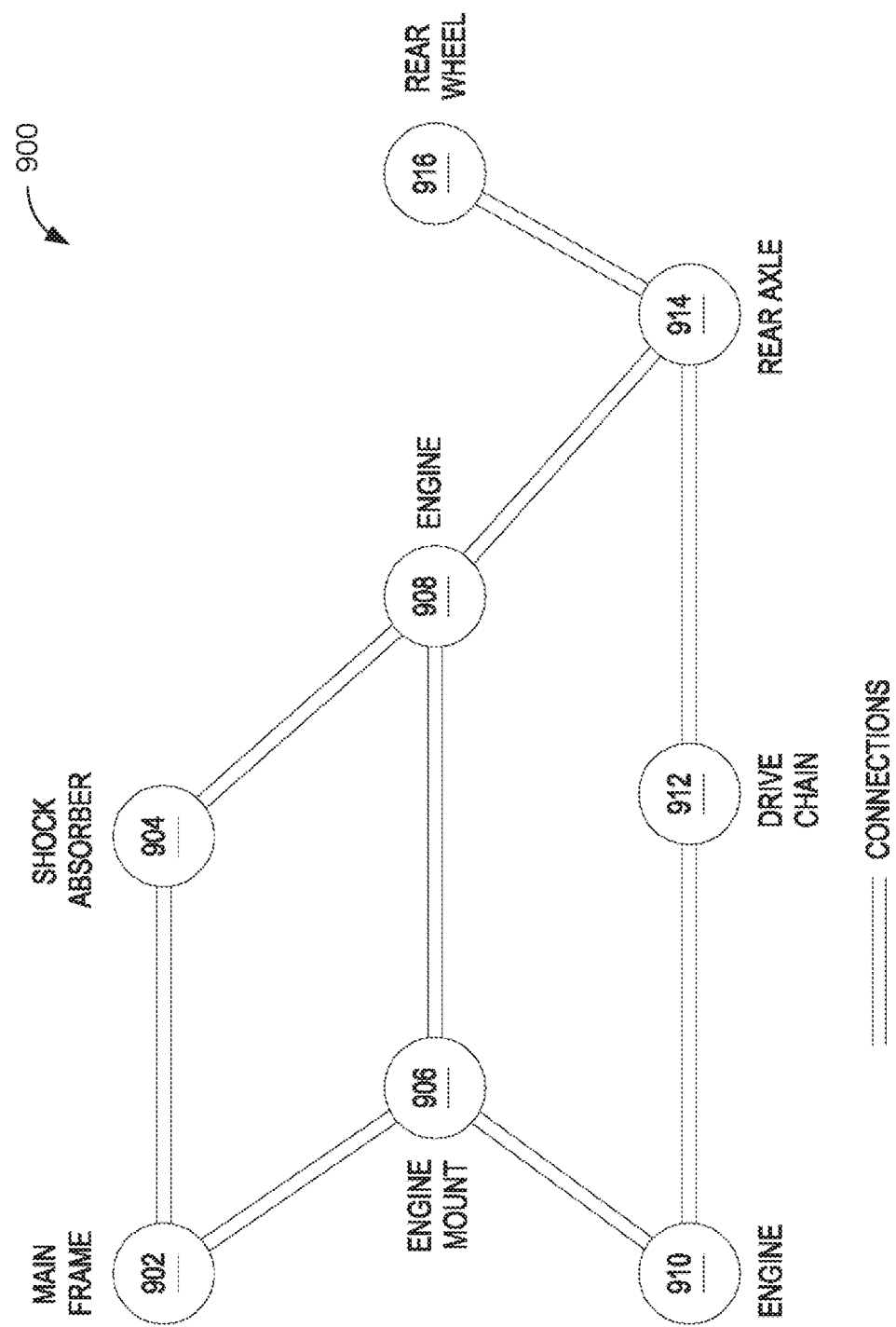
FIG. 9 illustrates a structural model of a system stored within the knowledge base of FIG. 2, according to various embodiments of the present invention.
Figure 10:
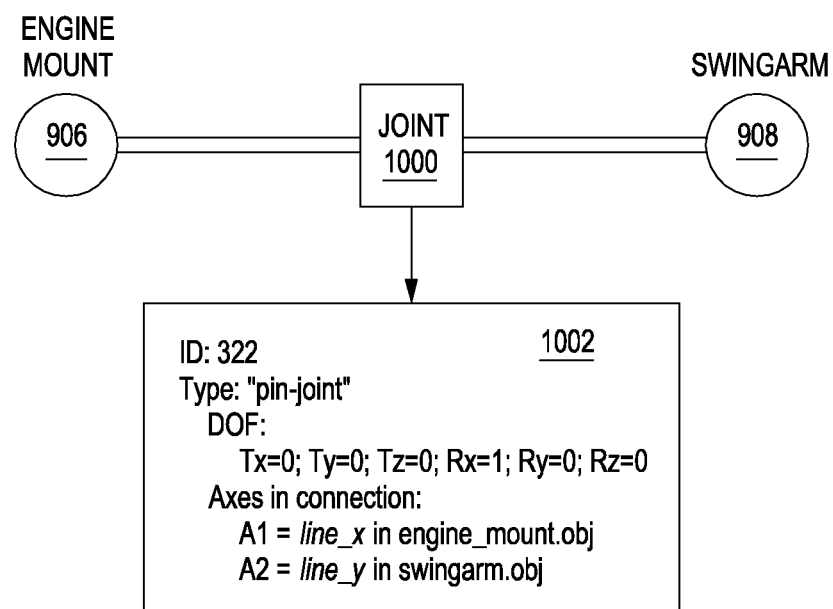
FIG. 10 illustrates a joint connection associated with the structural model of FIG. 9, according to various embodiments of the present invention.

Structural data 708 includes structural models of engineering systems. In the context of this disclosure, a "structural model" refers to a network of component nodes coupled by physical relationships and/or connections. For example, a structural model of a helicopter could include components "tail" and "tail rotor" coupled together via a "joint" type connection. This structural model could be interpreted to mean that the tail rotor of a helicopter is connected to the tail of the helicopter by a joint. Structural relationships such as these can be built up to describe an engineering system of any complexity. FIGS. 9-10 describe an exemplary structural model in greater detail.

Referring now to FIG. 9, as shown, a structural model 900 includes a collection of nodes 902, 904, 906, 908, 910, 912, 914, and 916 coupled together by various connections. Each such node corresponds to a different component of a system. Here, that system is a motor assembly. Each connection may be of a certain type, an example of which is shown in FIG. 10. As shown in FIG. 10, engine mount node 906 is coupled to swingarm node 908 by a joint 1000, which is defined by joint specification 1002. Any of the connections shown in FIG. 9 may be further defined according to a wide variety of technically feasible connection types, such as the exemplary joint type shown in FIG. 10.

Referring back now to FIG. 7, structural data 708 may include structural models, such as that described in conjunction with FIGS. 9-10, associated with a wide variety of different systems. Structural comparator 702 is configured to process system criteria 210 to identify various structural relationships present in those criteria, and to then identify, within structural data 708, any structural models that may be similar. For example, if system criteria 210 specified that the target system should include an engine mount coupled to a swingarm by a joint-type connection, then structural comparator 702 would identify that structural model 900, discussed above, does indeed include such a structural relationship, as shown in FIG. 10. Having this particular structural relationship indicates that structural model 900 is relevant to the target system associated with system criteria 210 by virtue of having similar structure. Structural comparator 702 would then extract the system associated with the structural model, including any related taxonomic and/or functional models, for inclusion into system templates 310 and/or system model 308.

Functional data 710 includes functional models of engineering systems. In the context of this disclosure, a "functional model" refers to a network of components configured to represent the transfer of various types of energy between those components, including force, heat, torque, and so forth. For example, a functional model of a bicycle transmission could include components "chain" and "gear," which have a functional relationship representing a conversion from tension associated with the chain to torque associated with the gear. This functional model could be interpreted to mean that the gear converts tension from the chain into torque. A collection of these functional relationships may describe functional attributes of any engineering system. Examples of functional models are described in conjunction with FIGS. 11-12.

Figure 11:
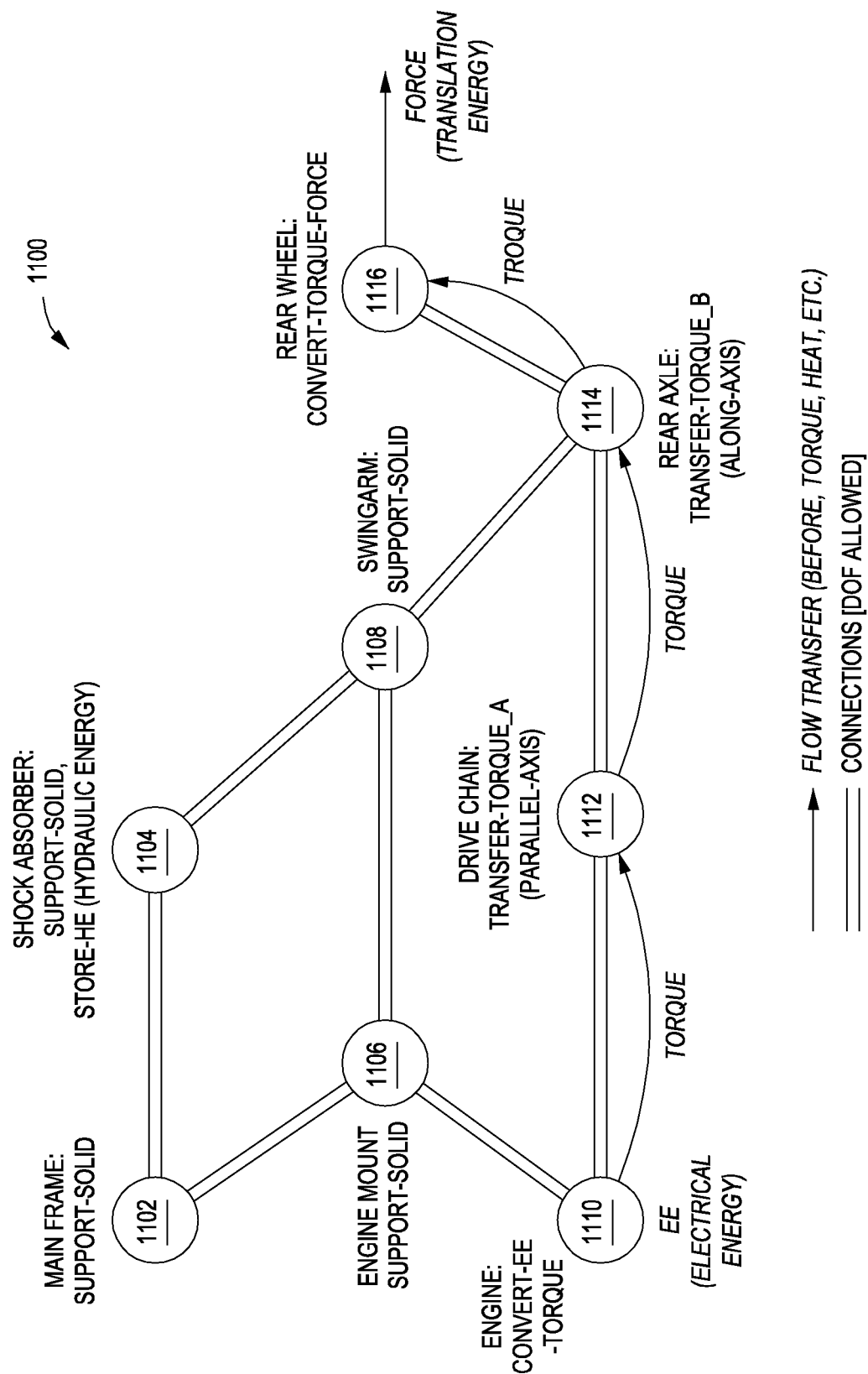
FIG. 11 illustrates a functional model of a system stored within the knowledge base of FIG. 2, according to various embodiments of the present invention.

Referring now to FIG. 11, as shown, a functional model 1100 includes various nodes 1102, 1104, 1106, 1108, 1110, 1112, 1114, and 1116. The nodes shown in functional model 1100 are derived from those shown in structural model 900 of FIG. 9. In addition, various flow transfers are shown that illustrate how different nodes transfer energy to other nodes. For example, drive chain 1112 transfers torque to rear axle 1114. Functional models such as that shown in FIG. 11 generally represent how a structure of a system functions. Thus, functional models are generally correlated, to some degree, with corresponding structural models. A functional model may also be related to an activity model, as shown in FIG. 12.

Figure 12:
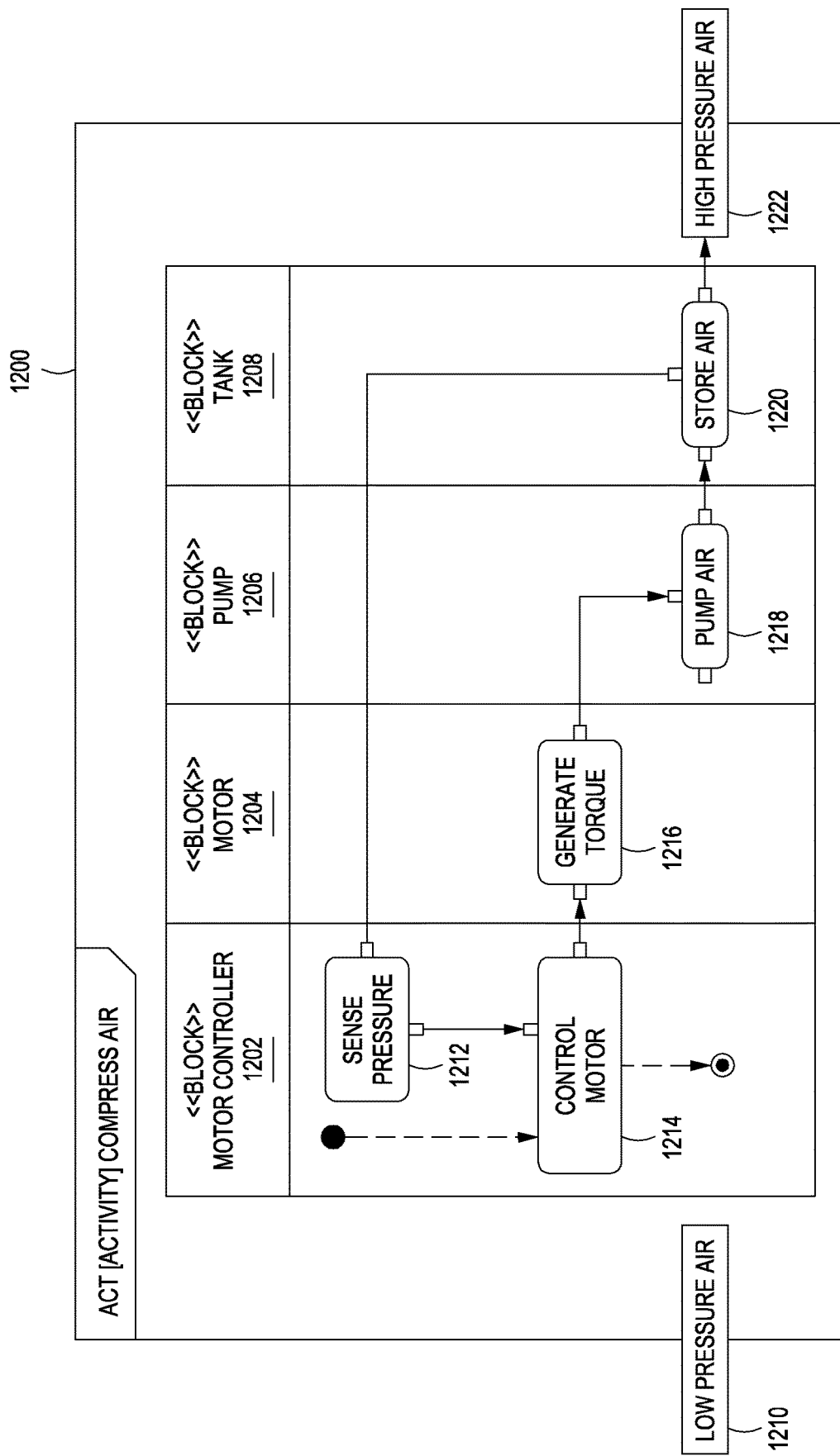
FIG. 12 illustrates an activity diagram of a system stored within the knowledge base of FIG. 2, according to various embodiments of the present invention.

As shown in FIG. 12, activity model 1200 includes various blocks 1202, 1204, 1206, and 1208 that corresponding to different parts of an air compressor. Each block performs specific functions associated with the overall task of compressing air. Block 1202 performs tasks 1212 and 1214, block 1204 performs task 1216, block 1206 performs task 1218, and block 1208 performs task 1220. More generally, activity model 1200 shows how low pressure air 1210, an input, is processed to create high pressure air 1222, an output. Thus, activity model 1200 represents a complex system-level function. Referring generally to FIGS. 11-12, these two figures represent different ways of expressing functional relationships between components of a system.

Referring back now to FIG. 7, functional data 710 may include functional models and/or activity models, such as those described in conjunction with FIGS. 11-12, respectively, associated with a wide variety of different systems. Functional comparator 704 is configured to process system criteria 210 to identify various functional relationships present in those criteria, and to then identify, within functional data 710, any models that may be functionally similar. For example, if system criteria 210 specified that the target system should include an axle that transfers torque to a wheel, then functional comparator 704 would identify that functional model 1100, discussed above, does indeed include such a functional relationship between nodes 1114 and 1116. Having this particular functional relationship indicates that functional model 1100 is relevant to the target system associated with system criteria 210 by virtue of having similar function. Functional comparator 704 would then extract the system associated with the functional model, including any related taxonomic and/or structural models, for inclusion into system templates 310 and/or system model 308.

To summarize, the various comparators shown within knowledge base navigator 202 are configured to search knowledge base 208 for systems having taxonomic, structural, or functional attributes and/or relationships that are similar to those set forth in system criteria 210. Those systems, and corresponding system geometry, can be extracted from knowledge base 208 and included into system templates 310 to provide a starting point for optimization via multi-objective solver 306.

In one embodiment, knowledge base 208 may store other types of data beyond the taxonomic, structural, and functional data discussed thus far. For example, knowledge base 208 could store data reflective of logical groupings associated with a system, where those groupings may not be physically identifiable but, instead, would be identifiable to a human observer.

In another embodiment, knowledge base navigator 202 allows the end-user to directly search knowledge base 208 via search queries. In response to such search queries, knowledge base navigator 202 may provide one or more system templates meeting the criteria associated with those queries. For example, the end-user could input a search query that targets systems capable of converting chemical energy into compressed air. In response to this query, knowledge base navigator 202 could determine that a system associated with activity model 1200 shown in FIG. 12, which compresses air, meets the search criteria. Knowledge base navigator 202 would then provide the associated system to the end-user.

In yet another embodiment, knowledge base navigator 202 may process queries received from the end-user which do not directly target a specific system. In response, knowledge base navigator 202 may generate a hybrid system, based on systems stored in knowledge base 208, which nonetheless meet the search criteria. For example, the end-user could query knowledge base 208 for a "flying bicycle." In response, knowledge base navigator 202 would identify all "flying" systems as well as all "bicycle" systems. Then, knowledge base navigator 202 would combine these systems based on the functional and structural models associated with each respective system. In doing so, knowledge base navigator 202 could determine that the chain ring of a bicycle system is capable of transferring torque, and the propeller portion of a flying system is capable of transferring torque into thrust, and then link these two portions of the respective systems together to create a hybrid system potentially capable of powered flight via pedal power. Persons skilled in the art will understand that systems associated with the structural and functional models discussed herein may be combined via various combinations of those structural and functional models.

Once system optimizer 200 generates system design 206 via the techniques described thus far, knowledge base navigator 202 may place geometry associated with system design 206 into knowledge base 208, along with corresponding taxonomic, structural, and functional models, to allow system design 206 to be used as a system template for future projects. In doing so, knowledge base navigator 202 may identify system templates already stored in knowledge base 208 that are similar to system design 206. Knowledge base navigator 206 may determine similarity between any two systems based on the taxonomic, structural, and functional attributes of those systems.

Knowledge base navigator 202 then stores system design 206 in a location of knowledge base 208 that is reflective of the similarity of that system to other previously stored systems. System design 206 and associated geometry may then be queried from knowledge base 208 based on the taxonomic, structural and functional models associated with that design. In one embodiment, the end-user may manually configure and/or generate classifications of design ontologies within knowledge base 208.

Although described thus far with respect to specific examples and particular systems, the general approach implemented by knowledge base navigator 202 is described in stepwise fashion below in conjunction with FIG. 13.

Figure 13:
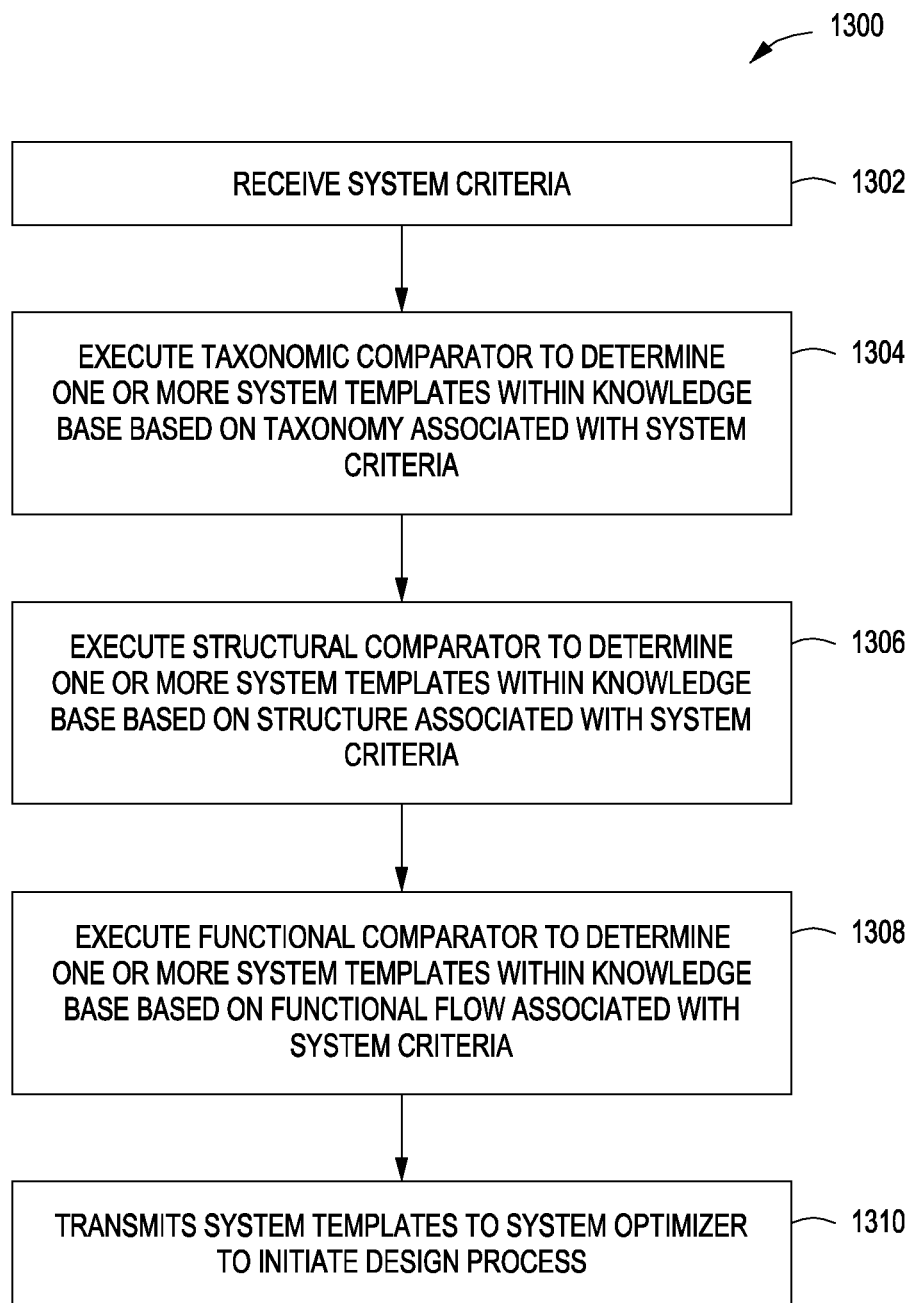
FIG. 13 is a flow diagram of method steps for extracting one or more system templates from a knowledge base, according to various embodiments of the present invention.

FIG. 13 is a flow diagram of method steps for extracting one or more system templates from a knowledge base, according to various embodiments of the present invention. Although the method steps are described in conjunction with the systems of FIGS. 1-12, persons skilled in the art will understand that any system configured to perform the method steps, in any order, is within the scope of the present invention.

As shown, a method 1300 begins at step 1302, where knowledge base navigator 202 receives system criteria 210. As discussed, system criteria 210 may include various design objectives, constraints, and boundary conditions. In addition, system criteria 210 may indicate particular taxonomic, structural, or functional criteria that the target design should meet.

At step 1304, knowledge base navigator 202 executes taxonomic comparator 700 to determine one or more system templates within knowledge base 208 based on any taxonomic attributes set forth in system criteria 210. For example, taxonomic comparator 700 could search taxonomic data 706 within knowledge base 208 to identify systems with "a wheel that has eight spokes." Upon identifying such a system, taxonomic comparator 700 would include this system into system templates 310.

At step 1306, knowledge base navigator 202 executes structural comparator 702 to determine one or more system templates within knowledge base 208 based on any structural attributes set forth in system criteria 210. For example, structural comparator 702 could search structural data 708 within knowledge base 208 to identify systems with a shaft that is coupled to another shaft via a universal joint. Upon identifying such a system, structural comparator 702 would include this system into system templates 310.

At step 1308, knowledge base navigator 202 executes functional comparator 704 to determine one or more system templates within knowledge base 208 based on any functional attributes set forth in system criteria 210. For example, functional comparator 704 could search functional data 710 within knowledge base 208 to identify systems with a chain that transfers torque to a wheel. Upon identifying such a system, functional comparator 704 would include this system into system templates 310.

At step 1310, knowledge base navigator 202 transmits system templates 310, including any systems with relevant taxonomic, structural, or functional attributes, to system optimizer 200. System optimizer 200 may use these templates to jump-start or warm-start multi-objective solver 306 and quickly initiate the generative design process.

An advantage of the technique described herein is that because the knowledge base includes a vast collection of well-known systems, having searchable taxonomy, structure, and function, the end-user may draw from these systems when creating a new system. Thus, the end-user is not forced to reinvent the wheel, so to speak. FIGS. 14-18 describe how knowledge base 208 is generated.

Generating a Knowledge Base from Textual Corpora

Figure 14:
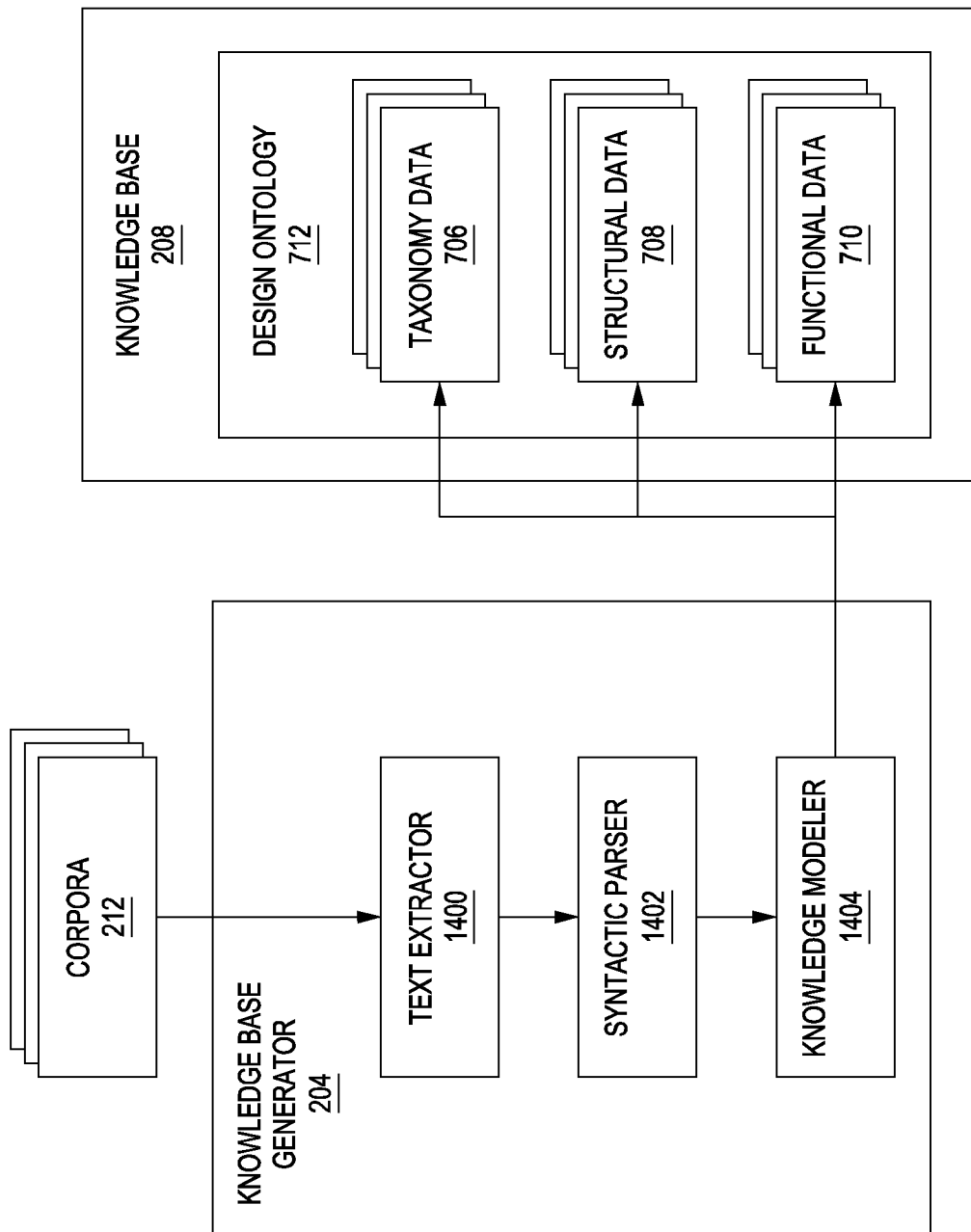
FIG. 14 is a more detailed illustration of the knowledge base generator of FIG. 2, according to various embodiments of the present invention.

FIG. 14 is a more detailed illustration of the knowledge base generator of FIG. 2, according to various embodiments of the present invention. As shown, knowledge base generator 204 includes a text extractor 1400, a syntactic parser 1402, and a knowledge modeler 1404, arranged in a processing pipeline. This processing pipeline is configured to process corpora 212 to generate taxonomy data 706, structural data 708, and functional data 710, which may include the taxonomic, structural, and functional models such as those described by way of example in conjunction with FIGS. 8-12.

In operation, text extractor 1400 scans corpora 212 and extracts segments of text that may include taxonomic, structural, or functional information regarding an engineering system. For a given segment of text, syntactic parser 1402 applies one or more syntactic parsing rules and converts the text segment into a parsed text segment. The parsed text segment distinguishes individual words and word phrases based on grammatical category. Finally, knowledge modeler 1404 processes the parsed text to generate a "knowledge model element." A knowledge model element is a construct that essentially captures a particular type of relationship, as described in greater detail below.

Depending on the type of text extracted, the resultant knowledge model element may be a taxonomic model element, a structural model element, or a functional model element. By performing this general process across a great length of text describing an engineering system, knowledge base generator 204 may generate a plethora of knowledge model elements of various types. These elements can be combined into a taxonomic model, such as that shown in FIG. 8, a structural model, such as that shown in FIG. 9, or a functional model, such as that shown in FIG. 11. By performing this process across a wide variety of engineering texts describing many different systems, knowledge base generator 208 may create many such models. This process is described by way of example below in conjunction with FIGS. 15-17.

Figure 15:
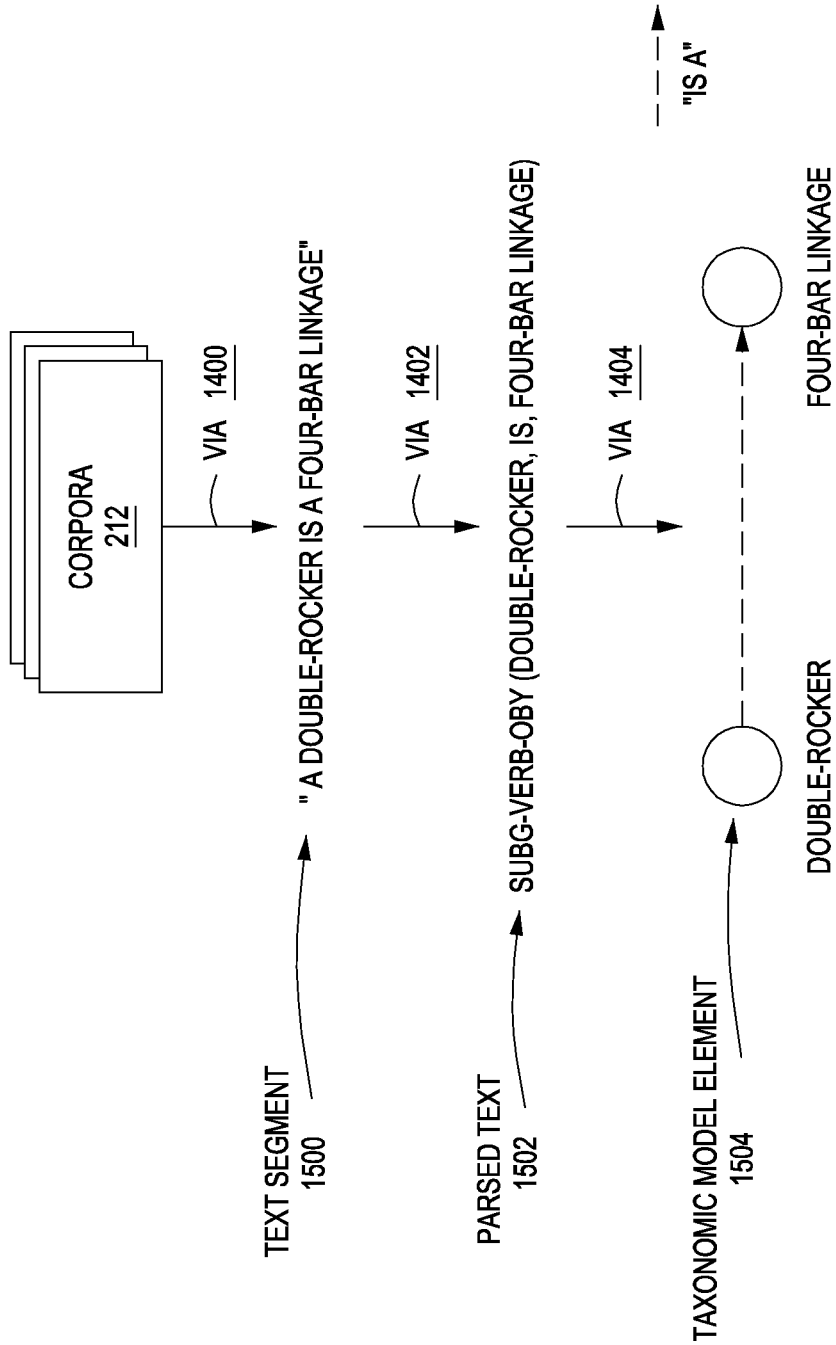
FIG. 15 illustrates how the knowledge base generator of FIG. 14 extracts taxonomic relationships associated with a system from a text corpus, according to various embodiments of the present invention.

FIG. 15 illustrates how the knowledge base generator of FIG. 14 extracts taxonomic relationships associated with a system from a text corpus, according to various embodiments of the present invention.

As shown, text extractor 1400 processes corpora 212 to extract text segment 1500, which reads "a double rocker is a four-bar linkage." Syntactic parser 1402 analyzes this text segment and applies various natural language processing (NLP) routines, including part-of-speech tagging, to generate parsed text 1502. Parsed text 1502 assigns the "subject" tag to "double rocker," the "verb" tag to "is," and the "object" tag to "four-bar linkage." Then, knowledge modeler 1404 processes parsed text 1502 to generate a taxonomic model element 1504 that includes components "double rocker" and "four-bar linkage" connected by a "is a" relationship. Taxonomic model element 1504 may form a portion of a larger taxonomic model, such as that shown in FIG. 8. By performing the process illustrated in FIG. 15 over many texts, knowledge base generator 204 may generate many such models that describe a variety of different systems.

Figure 16:
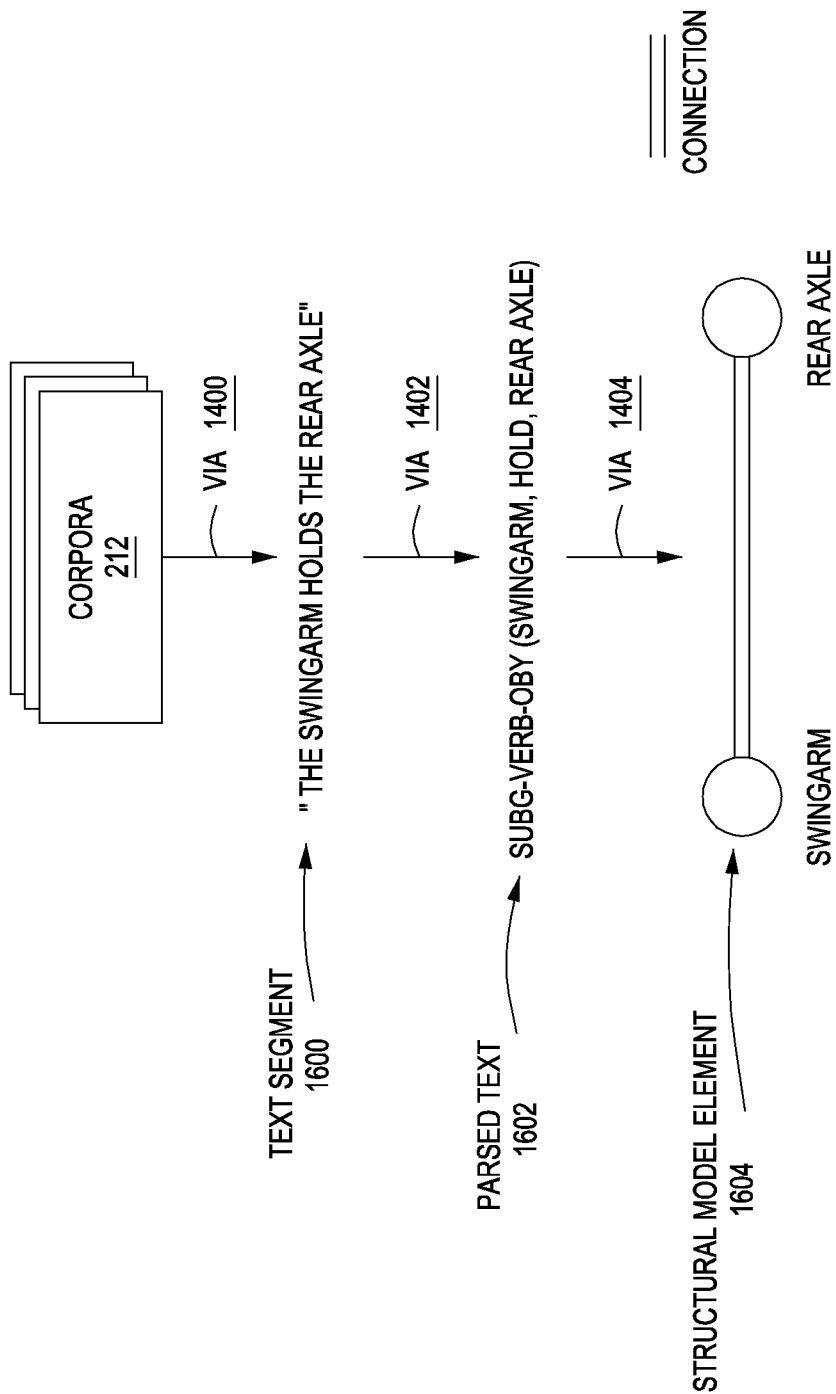
FIG. 16 illustrates how the knowledge base generator of FIG. 14 extracts structural relationships associated with a system from a text corpus, according to various embodiments of the present invention.

FIG. 16 illustrates how the knowledge base generator of FIG. 14 extracts structural relationships associated with a system from a text corpus, according to various embodiments of the present invention.

As shown, text extractor 1400 processes corpora 212 to extract text segment 1600, which reads "the swingarm holds the rear axle." Syntactic parser 1402 analyzes this text segment and applies various NLP routines, including part-of-speech tagging, to generate parsed text 1602. Parsed text 1602 assigns the "subject" tag to "swingarm," the "verb" tag to "holds," and the "object" tag to "rear axle." Knowledge modeler 1404 then processes parsed text 1602 to generate a structural model element 1604 that includes components "swingarm" and "rear axle" coupled together by a connection. The connection could be, for example, a joint-type connection, as described above in conjunction with FIG. 10. Structural model element 1604 may form a portion of a larger structural model, such as that shown in FIG. 9. By performing the process illustrated in FIG. 16 over many texts, knowledge base generator 204 may generate many such models that describe a variety of different systems.

Figure 17:
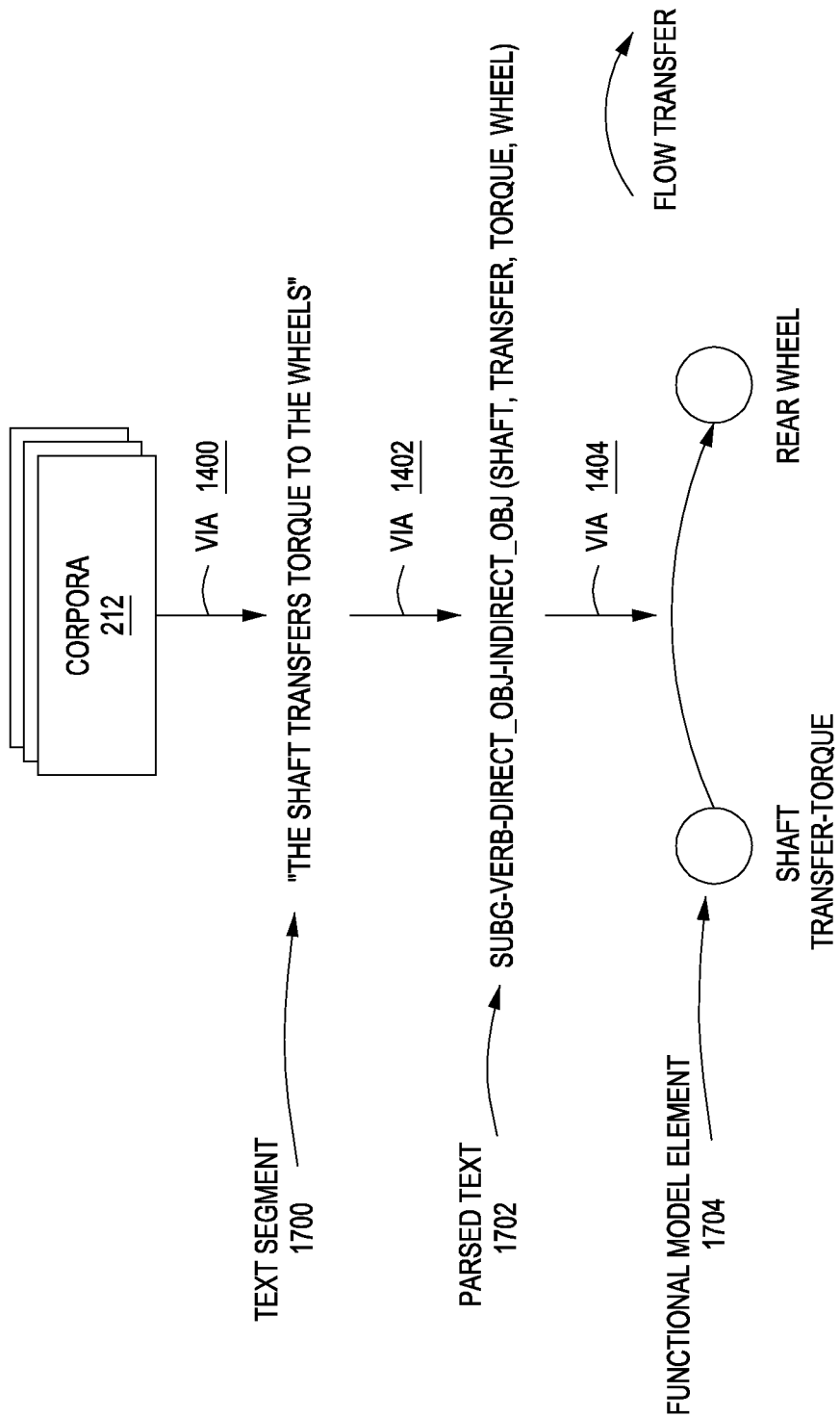
FIG. 17 illustrates how the knowledge base generator of FIG. 14 extracts functional relationships associated with a system from a text corpus, according to various embodiments of the present invention.

FIG. 17 illustrates how the knowledge base generator of FIG. 14 extracts functional relationships associated with a system from a text corpus, according to various embodiments of the present invention.

As shown, text extractor 1400 processes corpora 212 to extract text segment 1700, which reads "the shaft transfers torque to the wheels." Syntactic parser 1402 analyzes this text segment and applies various NLP routines, including part-of-speech tagging, to generate parsed text 1702. Parsed text 1702 assigns the "subject" tag to "shaft," the "verb" tag to "transfers," the "indirect object" tag to "torque," and the "object" tag to "wheels." Finally, knowledge modeler 1404 processes parsed text 1702 to generate a functional model element 1704 that includes components "shaft" and "rear wheel" coupled together by the functional relationship "transfer-torque." Functional model element 1704 may form a portion of a larger functional model, such as that shown in FIG. 11. By performing the process illustrated in FIG. 17 over many texts, knowledge base generator 204 may generate many such models that describe a variety of different systems.

Referring generally to FIGS. 15-17, knowledge base generator 204 may perform any of the processes described in these figures depending on whether a taxonomic, structural, or functional relationship is present in the extracted text. Knowledge base generator 204 may identify that a particular relationship is present in text based on a statistical analysis or by applying different syntactic parsing rules. Further, knowledge base generator 204 may associate knowledge model elements with different pre-existing knowledge models based on a statistical analysis of the texts from which those knowledge model elements are derived. The process describe above for generating knowledge model elements is described in stepwise fashion below in conjunction with FIG. 18.

Figure 18:
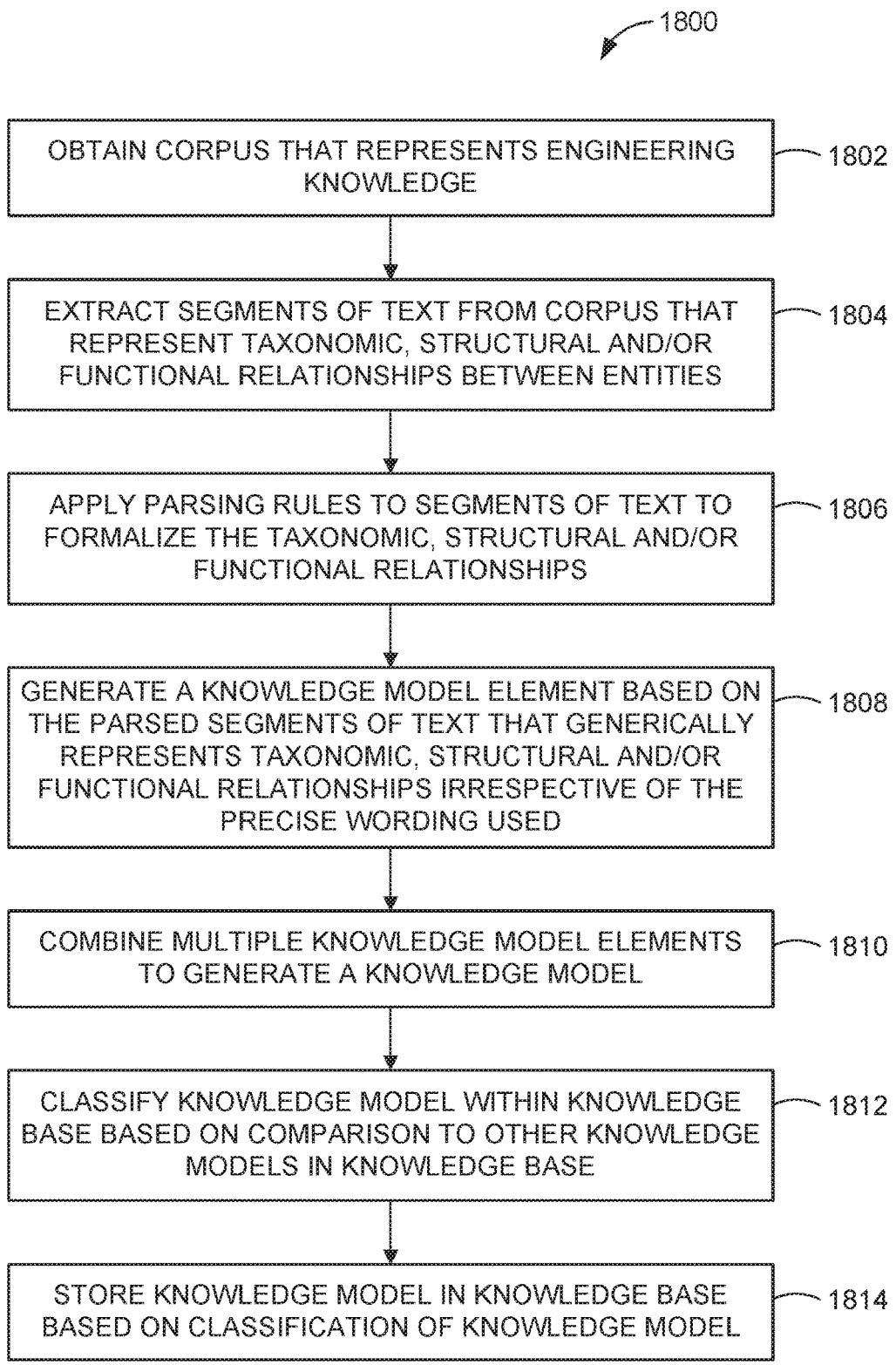
FIG. 18 is a flow diagram of method steps for generating a knowledge model for a system, according to various embodiments of the present invention.

FIG. 18 is a flow diagram of method steps for generating a knowledge model for a system, according to various embodiments of the present invention. Although the method steps are described in conjunction with the systems of FIGS. 1-17, persons skilled in the art will understand that any system configured to perform the method steps, in any order, is within the scope of the present invention.

As shown, a method 1800 begins at step 1802, where knowledge base generator 204 receives corpora 212 that includes one or more engineering texts. Those texts could describe mechanical, aerodynamic, electrical, hydraulic, or other types of engineering systems. At step 1804, text extractor 1400 within knowledge base generator 204 extracts segments of text from corpus 212 that represent taxonomic, structural, and/or functional relationships between entities.

At step 1806, syntactic parser 1402 within knowledge base generator 204 applies parsing rules to the segments of text extracted at step 1402 to formalize the taxonomic, structural, and/or functional relationships. In doing so, syntactic parser 1402 may apply NLP algorithms, including part-of-speech tagging, among others. At step 1808, knowledge modeler 1404 generates a knowledge model element based on the parsed segments of text, The knowledge model element generically represents the taxonomic, structural, and/or functional relationships irrespective of the precise wording used At step 1810, knowledge base generator 204 combines multiple knowledge model elements to generate a knowledge model of a system. The knowledge model may be a taxonomic model, such as that shown in FIG. 8, a structural model, such as that shown in FIG. 9, or a functional model, such as that shown in FIG. 11. At step 1812, knowledge base generator 204 classifies the knowledge model generated at step 1810 based on comparison to other knowledge models in knowledge base 208. In doing so, knowledge base generator 204 may compare taxonomic, structural, or functional attributes of knowledge models to determine a degree of similarity. At step 1814, knowledge base generator 204 stores the knowledge model in knowledge base 208 based on the classification of that knowledge model. The knowledge model, and corresponding system, may then be extracted by knowledge base navigator 202 and used as a system template to initiate operation of system optimizer 200.

In sum, a design application is configured to perform a system-level optimization of a collection of system components. The design application iteratively executes a multi-objective solver to optimize structural and functional relationships between the system components in order to meet global design criteria and generate a system design. The design application initializes the design process by extracting from a knowledge base system templates having taxonomic, structural, or functional attributes relevant to the system design. The design application generates the knowledge base by mining taxonomic, structural, and functional relationships from a corpus of engineering texts.

At least one advantage of the techniques described herein is that each system component can be optimized independently or in relation to other components in the system. Accordingly, the entire system can be optimized relative to system-level design objectives. In addition, the system templates provided by the knowledge base facilitate fast generation of system-level designs, eliminating the need to manually assemble independently designed parts. Finally, the knowledge base can be generated from a wealth of engineering knowledge included in the vast technical corpora available, making this engineering knowledge directly accessible to engineers.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating a knowledge base, the method comprising:
  applying a set of syntactic parsing rules to a first text segment included in a set of corpora to generate a first parsed text segment, wherein each corpus in the set of corpora describe one or more electrical, mechanical, or hydraulic systems;
  automatically generating, based on the first parsed text segment, a first knowledge model element that identifies a first relationship between a first plurality of components of a first system
  determining, using the vector space model trained on the set of corpora, a similarity between the first parsed text segment and a plurality of word vectors included in the vector space model;
  classifying, based on the similarity, the first relationship as having a first type, wherein the first type comprises one of an electrical relationship, a mechanical relationship, or a hydraulic relationship;
  generating an association between the first knowledge model element and a plurality of pre-existing knowledge models of the first type, wherein the association is based on a statistical analysis of a plurality of text segments associated with the plurality of pre-existing knowledge models of the first type; and
  generating, based on the first knowledge model element and on the association, a first model of the first system that includes a geometry of a first component included in the plurality of components.

2. The computer-implemented method of claim 1, wherein applying the set of syntactic parsing rules comprises determining a part of speech for each element included in the first text segment.

3. The computer-implemented method of claim 1, wherein the first relationship comprises a taxonomic relationship between the first component of the first system and a second component of the first system.

4. The computer-implemented method of claim 3, wherein the first relationship identifies that the first component comprises the second component or that the first component subsumes the second component.

5. The computer-implemented method of claim 1, wherein the first relationship comprises a structural relationship between the first component of the first system and a second component of the first system.

6. The computer-implemented method of claim 5, wherein the first relationship identifies that the first component is physically connected to the second component within the first system.

7. The computer-implemented method of claim 1, wherein the first relationship comprises a functional relationship between the first component of the first system and a second component of the first system.

8. The computer-implemented method of claim 7, wherein the first relationship identifies that the first component is configured to transfer at least one of energy, force, or torque to the second component.

9. The computer-implemented method of claim 1, further comprising:

applying the set of syntactic parsing rules to a second text segment included in the set of corpora to generate a second parsed text segment;
  generating, based on the second parsed text segment, a second knowledge model element that identifies a second relationship between a second plurality of components of the first system;
  determining, using the vector space model, a second similarity between the second parsed text segment and the plurality of word vectors; and
  classifying, based on the second similarity, the second relationship as having the first type or a second type, wherein the second type comprises one of an electrical relationship, a mechanical relationship, or a hydraulic relationship.

10. The computer-implemented method of claim 9, further comprising:
  combining the first knowledge model element and the second knowledge model element to generate the first model
  classifying the first model based on at least one of the first knowledge model element or the second knowledge model element;
  based on the classification, storing the first model in the knowledge base; and
  extracting the first model and the first system to initiate a design process.

11. One or more non-transitory computer-readable media storing instructions that, when executed by one or more processors, cause the one or more processors to generate a knowledge base by performing the steps of:
  applying a set of syntactic parsing rules to a first text segment included in a set of corpora to generate a first parsed text segment, wherein each corpus in the set of corpora describe one or more electrical, mechanical, or hydraulic systems;
  automatically generating, based on the first parsed text segment, a first knowledge model element that identifies a first relationship between a first plurality of components of a first system
  determining, using a vector space model trained on the set of corpora, a similarity between the first parsed text segment and a plurality of word vectors included in the vector space model;
  classifying, based on the similarity, the first relationship as having a first type, wherein the first type comprises one of an electrical relationship, a mechanical relationship, or a hydraulic relationship;
  generating an association between the first knowledge model element and a plurality of pre-existing knowledge models of the first type, wherein the association is based on a statistical analysis of a plurality of text segments associated with the plurality of pre-existing knowledge models of the first type; and
  generating, based on the first knowledge model element and on the association, a first model of the first system that includes a geometry of a first component included in the plurality of components.

12. The one or more non-transitory computer-readable media of claim 11, wherein applying the set of syntactic parsing rules comprises determining a part of speech for each element included in the first text segment.

13. The one or more non-transitory computer-readable media of claim 11, wherein the first relationship comprises a taxonomic relationship between the first component of the first system and a second component of the first system.

14. The one or more non-transitory computer-readable media of claim 13, wherein the first relationship identifies that the first component comprises the second component or that the first component subsumes the second component.

15. The one or more non-transitory computer-readable media of claim 11, wherein the first relationship comprises a structural relationship between the first component of the first system and a second component of the first system.

16. The one or more non-transitory computer-readable media of claim 15, wherein the first relationship identifies that the first component is physically connected to the second component within the first system.

17. The one or more non-transitory computer-readable media of claim 11, wherein the first relationship comprises a functional relationship between the first component of the first system and a second component of the first system.

18. The one or more non-transitory computer-readable media of claim 17, wherein the first relationship identifies that the first component is configured to transfer at least one of energy, force, or torque to the second component.

19. The one or more non-transitory computer-readable media of claim 11, further comprising:
   applying the set of syntactic parsing rules to a second text segment included in the set of corpora to generate a second parsed text segment;
   generating, based on the second parsed text segment, a second knowledge model element that identifies a second relationship between a second plurality of components of the first system;
   determining, using the vector space model, a second similarity between the second parsed text segment and the plurality of word vectors; and
   classifying, based on the second similarity, the second relationship as having the first type or a second type, wherein the second type comprises one of an electrical relationship, a mechanical relationship, or a hydraulic relationship.

20. The one or more non-transitory computer-readable media of claim 19, further comprising:
   combining the first knowledge model element and the second knowledge model element to generate the first model classifying the first model based on at least one of the first knowledge model element or the second knowledge model element;
   based on the classification, storing the first model in the knowledge base; and
   extracting the first model and the first system to initiate a design process.

21. A system, comprising:
   a memory storing instructions; and
   a processor coupled to the memory and, when executing the instructions:
      applying a set of syntactic parsing rules to a first text segment included in a set of corpora to generate a first parsed text segment, wherein each corpus in the set of corpora describe one or more electrical, mechanical, or hydraulic systems;
      automatically generating, based on the first parsed text segment, a first knowledge model element that identifies a first relationship between a first plurality of components of a first system
      determining, using a vector space model trained on the set of corpora, a similarity between the first parsed text segment and a plurality of word vectors included in the vector space model;
      classifying, based on the similarity, the first relationship as having a first type, wherein the first type comprises one of an electrical relationship, a mechanical relationship, or a hydraulic relationship;
      generating an association between the first knowledge model element and a plurality of pre-existing knowledge models of the first type, wherein the association is based on a statistical analysis of a plurality of text segments associated with the plurality of pre-existing knowledge models of the first type; and
      generating, based on the first knowledge model element and on the association, a first model of the first system that includes a geometry of a first component included in the plurality of components.

* * * * *